United States Patent
Farag et al.

(10) Patent No.: US 12,395,216 B2
(45) Date of Patent: Aug. 19, 2025

(54) METHOD AND APPARATUS FOR BEAM MANAGEMENT AFTER CHANNEL SETUP

(71) Applicant: Samsung Electronics Co., Ltd., Suwon-si (KR)

(72) Inventors: Emad N. Farag, Flanders, NJ (US); Eko Onggosanusi, Coppell, TX (US); Aristides Papasakellariou, Houston, TX (US); Md. Saifur Rahman, Plano, TX (US); Dalin Zhu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/298,246

(22) Filed: Apr. 10, 2023

(65) Prior Publication Data

US 2023/0246684 A1  Aug. 3, 2023

Related U.S. Application Data

(63) Continuation of application No. 17/643,153, filed on Dec. 7, 2021, now Pat. No. 11,626,913.

(Continued)

(51) Int. Cl.
*H04B 7/06* (2006.01)
*H04W 72/23* (2023.01)

(52) U.S. Cl.
CPC ......... *H04B 7/0617* (2013.01); *H04B 7/0626* (2013.01); *H04W 72/23* (2023.01)

(58) Field of Classification Search
CPC .. H04B 7/0617; H04B 7/0626; H04W 72/042
See application file for complete search history.

(56) References Cited

U.S. PATENT DOCUMENTS 11,503,585 B2 * 11/2022 Zhang .................. H04L 41/0803
11,503,601 B2 * 11/2022 Hakola ................ H04B 7/0408
(Continued)

FOREIGN PATENT DOCUMENTS

| EP | 4057521 A1 | 9/2022 |
| WO | 2020247797 A1 | 12/2020 |
| WO | 2022132631 A1 | 6/2022 |

OTHER PUBLICATIONS

"5G; NR; Physical channels and modulation (3GPP TS 38.211 version 16.7.0 Release 16)", ETSI TS 138 211 V16.7.0, Oct. 2021, 138 pages.

(Continued)

*Primary Examiner* — Jaison Joseph

(57) ABSTRACT

Methods and apparatuses for beam management after channel setup. A method of operating a user equipment (UE) includes receiving at least one of synchronization signal/physical broadcast channel block (SSB) or channel state information reference signal (CSI-RS), measuring the at least one of the SSB or the CSI-RS, and determining downlink (DL) quasi-co-location (QCL) properties for DL communication based on the at least one of the SSB or the CSI-RS. The method further includes determining an uplink (UL) spatial domain filter for UL communication, receiving DL channels using the determined DL QCL properties until only one of only one joint TCI state or only one DL TCI state is configured, activated, or indicated to the UE, and transmitting UL channels using the determined UL spatial domain filter until only one of only one joint TCI state or only one UL TCI state is configured, activated, or indicated to the UE.

20 Claims, 17 Drawing Sheets

Related U.S. Application Data

(60) Provisional application No. 63/126,901, filed on Dec. 17, 2020.

(56) References Cited

U.S. PATENT DOCUMENTS

| | | | |
|---|---|---|---|
| 2019/0141693 A1 | 5/2019 | Guo et al. | |
| 2019/0320469 A1 | 10/2019 | Huang et al. | |
| 2019/0387418 A1 | 12/2019 | Yerramalli | |
| 2020/0314708 A1* | 10/2020 | Jassal | H04W 16/28 |
| 2021/0135821 A1* | 5/2021 | Guan | H04L 5/0048 |
| 2023/0239125 A1* | 7/2023 | Yi | H04L 5/0048 370/329 |
| 2023/0246684 A1* | 8/2023 | Farag | H04B 7/0695 375/267 |

OTHER PUBLICATIONS

"5G; NR; Multiplexing and channel coding (3GPP TS 38.212 version 16.7.0 Release 16)", ETSI TS 138 212 V16.7.0, Oct. 2021, 157 pages.
"5G; NR; Physical layer procedures for control (3GPP TS 38.213 version 16.7.0 Release 16)", ETSI TS 138 213 V16.7.0, Oct. 2021, 191 pages.
"5G; NR; Physical layer procedures for data (3GPP TS 38.214 version 16.7.0 Release 16)", ETSI TS 138 214 V16.7.0, Oct. 2021, 176 pages.
"5G; NR; Medium Access Control (MAC) protocol specification (3GPP TS 38.321 version 16.6.0 Release 16)", ETSI TS 138 321 V16.6.0, Oct. 2021, 160 pages.
"5G; NR; Radio Resource Control (RRC); Protocol specification (3GPP TS 38.331 version 16.6.0 Release 16)", ETSI TS 138 331 V16.6.0, Oct. 2021, 948 pages.
Vivo, "Further discussion on multi beam enhancement", 3GPP TSG RAN WG1 #103-e, Nov. 26-Nov. 13, 2020, R1-2007644, 26 pages.
Moderator (Samsung), "Moderator summary#2 for multi-beam enhancement", 3GPP TSG RAN WG1 #103-e, Oct. 26-Nov. 13, 2020, R1-2009499, 41 pages.
Oppo, "Enhancements on Multi-Beam Operation", 3GPP TSG RAN WG1 #103-e, Oct. 26-Nov. 13, 2020, R1-2008217, 11 pages.
MediaTek Inc., "Enhancement on multi-beam operation", 3GPP TSG RAN WG1 #103-e, Oct. 26-Nov. 13, 2020, R1-2008956, 17 pages.
International Search Report dated Mar. 23, 2022 in connection with International Patent Application No. PCT/KR2021/019297, 3 pages.
Written Opinion of the International Searching Authority dated Mar. 23, 2022 in connection with International Patent Application No. PCT/KR2021/019297, 4 pages.
Partial European Search Report issued Apr. 26, 2024 regarding Application No. 21907163.6, 10 pages.
Ericsson, "Feature lead summary 3 for beam measurement and reporting", 3GPP TSG-RAN WG1 Meeting #93, R1-1807782, May 2018, 41 pages.
Ericsson, "Feature iead summary 2 on beam measurement and reporting", 3GPP TSG RAN WG1 Meeting #92b, R1-1805574, Apr. 2018, 29 pages.
Nokia et al., "Enhancements on Multi-beam Operation", 3GPP TSG RAN WG1 #106-bis-e, R1-2109870, Oct. 2021, 28 pages.
Extended European Search Report issued Sep. 9, 2024 regarding Application No. 21907163.6, 25 pages.

* cited by examiner

METHOD AND APPARATUS FOR BEAM MANAGEMENT AFTER CHANNEL SETUP

CROSS-REFERENCE TO RELATED APPLICATION AND CLAIM OF PRIORITY

This application is a continuation of U.S. patent application Ser. No. 17/643,153 filed on Dec. 7, 2020, which priority under 35 U.S.C. § 119(e) to U.S. Provisional Patent Application No. 63/126,901 filed on Dec. 17, 2020. The above-identified provisional patent application is hereby incorporated by reference in their entirety.

TECHNICAL FIELD

The present disclosure relates generally to wireless communication systems and, more specifically, the present disclosure relates to beam management after channel setup.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (such as a new radio access technology (RAT)) to flexibly accommodate various services/applications with different requirements, new multiple access schemes to support massive connections, and so on.

SUMMARY

This disclosure relates to methods and apparatuses for beam management after channel setup.

In one embodiment, a user equipment (UE) is provided. The UE includes a transceiver configured to receive at least one of a synchronization signal/physical broadcast channel block (SSB) or a channel state information reference signal (CSI-RS). The UE also includes a processor operably coupled to the transceiver. The processor is configured to measure the at least one of the SSB or the CSI-RS, determine downlink (DL) quasi-co-location (QCL) properties for DL communication based on the at least one of the SSB or the CSI-RS, and determine an uplink (UL) spatial domain filter for UL communication. The transceiver is further configured to transmit at least one of a preamble and a physical uplink shared channel (PUSCH) scheduled by a random access response using the UL spatial domain filter, receive configuration information including one or more transmission configuration indicator (TCI) states, receive DL channels using the determined DL QCL properties until only one of (i) only one joint TCI state or (ii) only one DL TCI state is configured, activated, or indicated to the UE, and transmit UL channels using the determined UL spatial domain filter until only one of (i) only one joint TCI state or (ii) only one UL TCI state is configured, activated, or indicated to the UE.

In another embodiment, a base station (BS) is provided. The BS includes a transceiver configured to transmit at least one of a SSB or a CSI-RS and receive at least one of a preamble and a PUSCH scheduled by a random access response from a UE using an UL spatial domain filter. The BS also includes a processor operably coupled to the transceiver. The processor is configured to determine DL QCL properties for DL communication based on the received at least one of the preamble and the PUSCH. The transceiver is further configured to transmit configuration information including one or more TCI states, transmit DL channels using the determined DL QCL properties until only one of (i) only one joint TCI state or (ii) only one DL TCI state is configured, activated, or indicated to the UE, and receive UL channels using the UL spatial domain filter until only one of (i) only one joint TCI state or (ii) only one UL TCI state is configured, activated, or indicated to the UE.

In yet another embodiment, method of operating a UE is provided. The method includes receiving at least one of a SSB or a CSI-RS, measuring the at least one of the SSB or the CSI-RS, and determining DL QCL properties for DL communication based on the at least one of the SSB or the CSI-RS. The method further includes determining an UL spatial domain filter for UL communication, transmitting at least one of a preamble and a physical uplink shared channel (PUSCH) scheduled by a random access response using the UL spatial domain filter, and receiving configuration information including one or more TCI states. The method further includes receiving DL channels using the determined DL QCL properties until only one of (i) only one joint TCI state or (ii) only one DL TCI state is configured, activated, or indicated to the UE and transmitting UL channels using the determined UL spatial domain filter until only one of (i) only one joint TCI state or (ii) only one UL TCI state is configured, activated, or indicated to the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
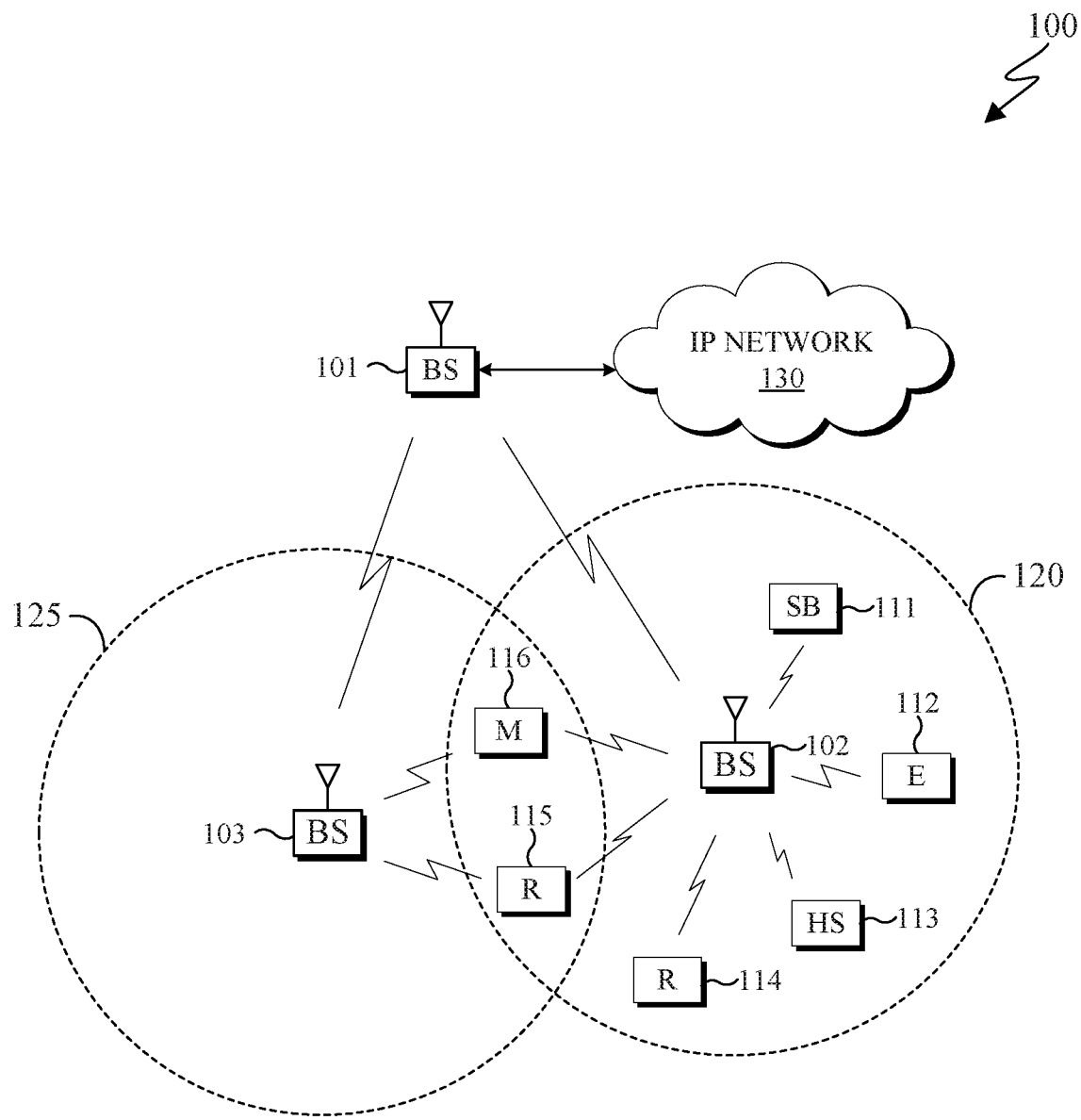
FIG. 1 illustrates an example wireless network according to embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein:

i. 3GPP TS 38.211 v16.7.0, "NR; Physical channels and modulation;"
ii. 3GPP TS 38.212 v16.7.0, "NR; Multiplexing and channel coding;"
iii. 3GPP TS 38.213 v16.7.0, "NR; Physical layer procedures for control;"
iv. 3GPP TS 38.214 v16.7.0, "NR; Physical layer procedures for data;"
v. 3GPP TS 38.321 v16.6.0, "NR; Medium access control (MAC) protocol specification;" and
vi. 3GPP TS 38.331 v16.6.0, "NR; Radio resource control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, such as 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, such as 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
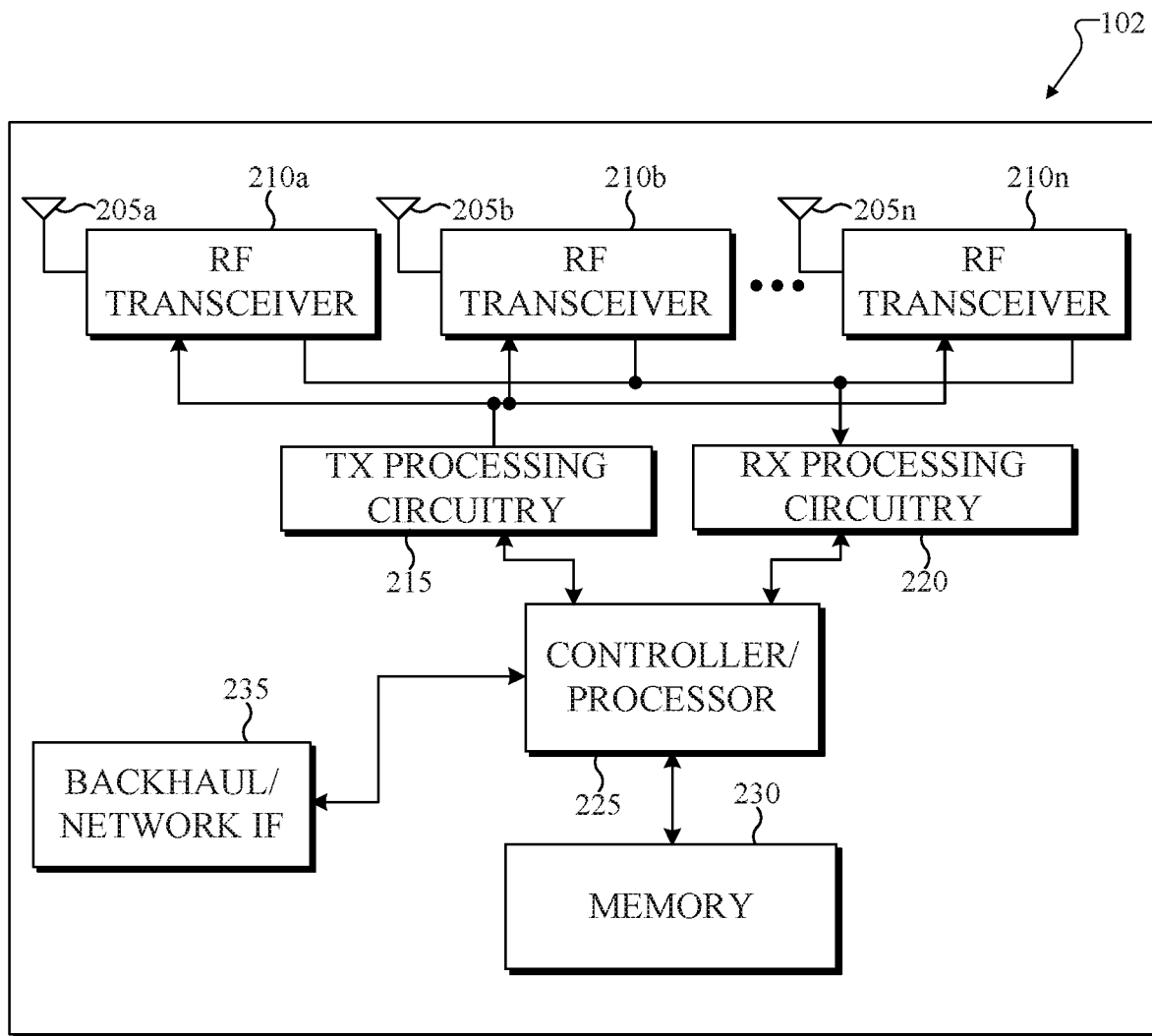
FIG. 2 illustrates an example base station (BS) according to embodiments of the present disclosure.
Figure 3:
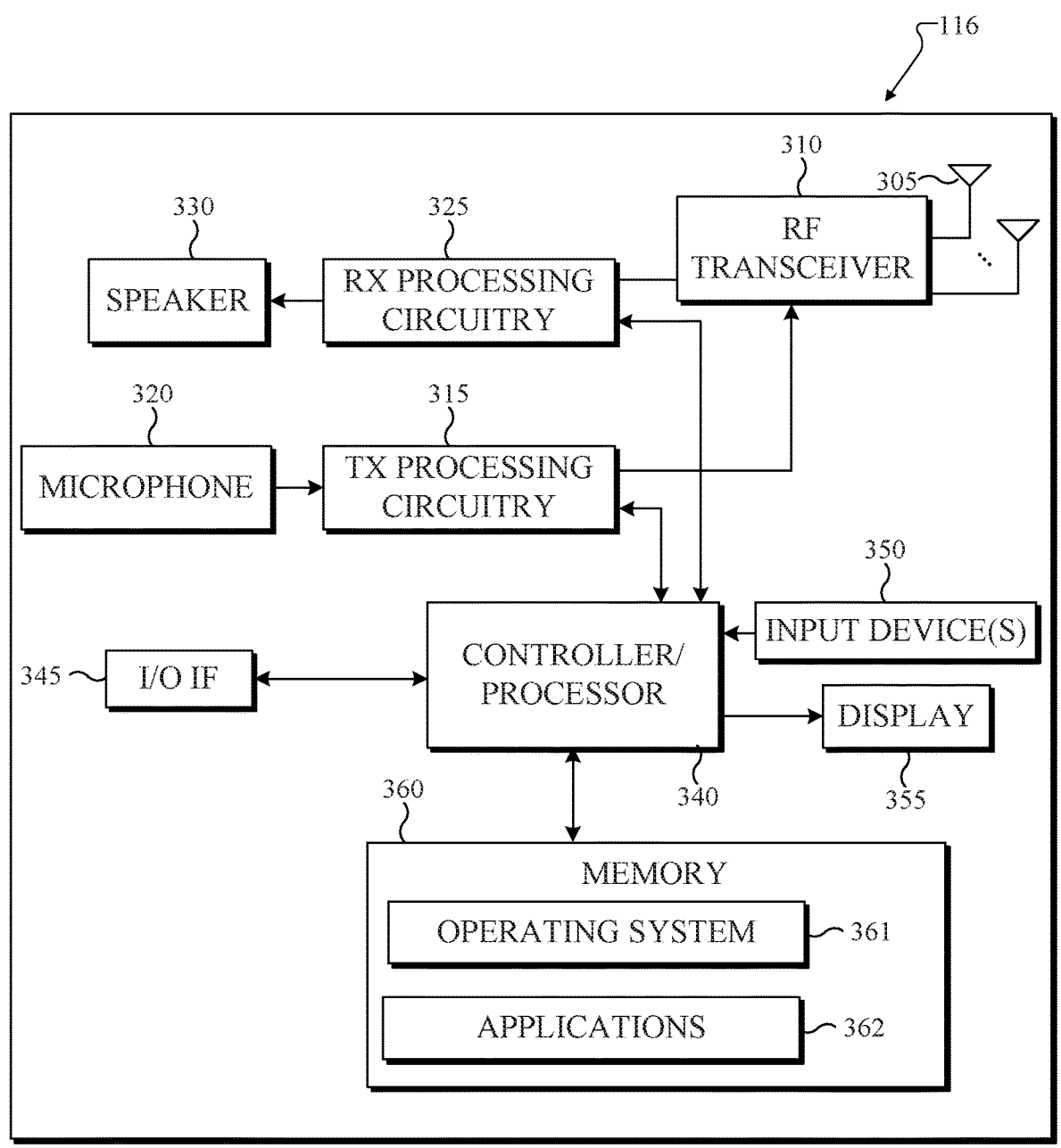
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for beam management after channel setup. In certain embodiments, and one or more of the BSs 101-103 includes circuitry, programing, or a combination thereof for beam management after channel setup.

In certain embodiments, one or more of BS 101, BS 102 and BS 103 include 2D antenna arrays. In certain embodiments, one or more of BS 101, BS 102 and BS 103 support the codebook design and structure for systems having 2D antenna arrays.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam management. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports beam management after channel setup. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other B Ss over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

In certain embodiments, transmit and receive paths of the BS 102 support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
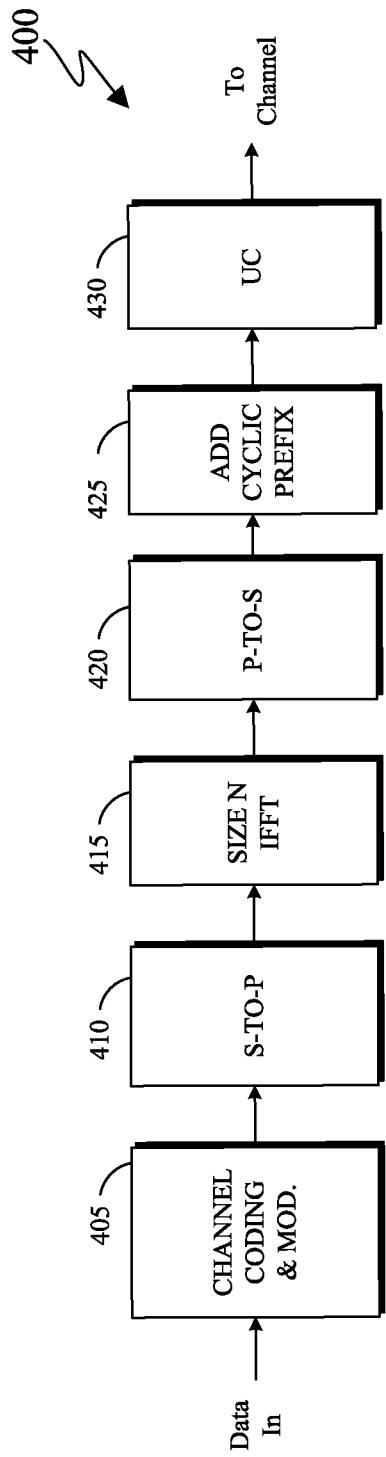
FIGS. 4 and 5 illustrate example wireless transmit and receive paths according to embodiments of present disclosure.
Figure 5:
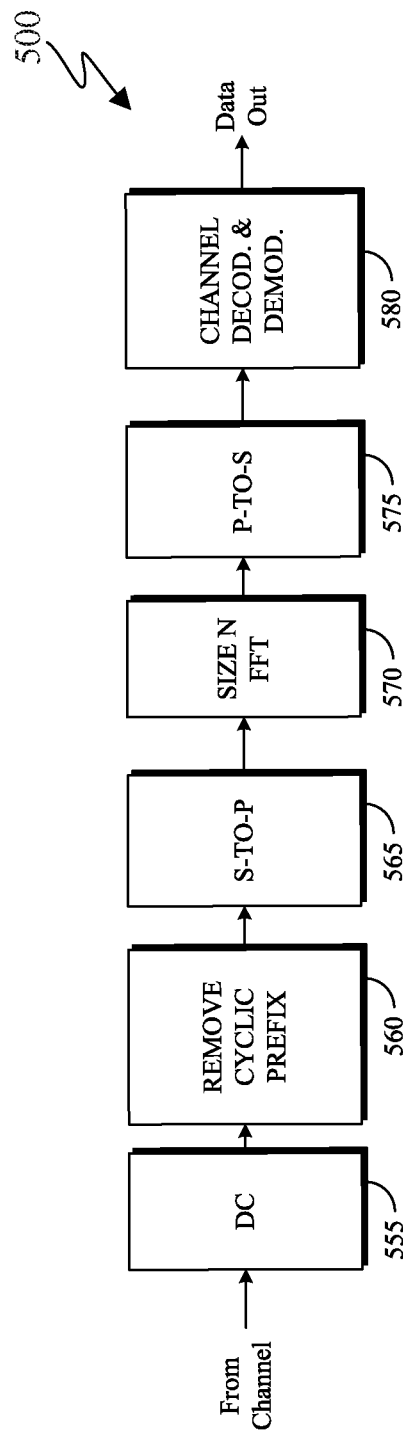

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support beam management after channel setup as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in the transmit path 400 of FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the DL to UEs 111-116 and may implement a receive path 500 as illustrated in FIG. 5 that is analogous to receiving in the UL from UEs 111-116. Similarly, each of UEs 111-116 may implement the transmit path 400 for transmitting in the UL to the BSs 101-103 and may implement the receive path 500 for receiving in the DL from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, a beam is determined by either a transmission configuration indicator (TCI) state or a spatial relation information. In either of these cases, the ID of the source reference signal identifies the beam. For example, a beam can be determined by a TCI state that establishes a quasi-colocation (QCL) relationship between a source reference signal (such as synchronized signal block (SSB) and/or channel state information (CSI) reference signal (RS)) and a target reference signal. Similarly, a beam can be determined by spatial relation information that establishes an association to a source reference signal, such as SSB or channel state information-reference signal (CSI-RS) or sounding reference signal (SRS). The TCI state and/or the spatial relation reference RS can determine a spatial Rx filter for reception of DL channels at the UE, or a spatial Tx filter for transmission of UL channels from the UE.

For example, the UE may receive and measure the SSB and/or the CSI-RS and determines a suitable reference signal (i.e., SSB and/or CSI-RS) among those measured to determine the QCL relationship(s) for subsequent transmissions. For UL, the UE can determine the spatial filter to use based on beam correspondence as an example. In this example, after determining the DL spatial filter, the UE determines the UL spatial filter as the one corresponding to the DL spatial filter. The UE may also determine the UL spatial filter based on beam sweeping in the UL. For example, the UE may try different UL spatial filters to find one that allows the RA procedure to succeed.

A suitable reference signal, can be a reference signal with a reference signal receive power (RSRP) that exceeds a configured threshold. Alternatively, a suitable reference signal can the reference signal with the largest RSRP among the measured reference signals (e.g., SSB and/or CSI-RS). Alternatively, a suitable reference signal can be determined based on UE implementation for example it can take into account the maximum permissible exposure (MPE) in certain direction when the UE transmitting in the UL.

After the UE determines the reference signal, a random access procedure is initiated. The physical random access channel occasion (PRACH) Occasion and the preamble used for PRACH is determined based on a mapping to the reference signal as described in clause 8.1 of TS 38.213. Upon receiving the preamble, the gNB can determine the reference signal determined by the UE (based on the mapping), and hence the QCL properties to use for DL communication. In response to the reception of the preamble, the gNB transmits a random access response (RAR) that can include an UL grant scheduling a physical uplink shared channel (PUSCH).

The random access procedure can be a 4-step random access procedure, known as Type-1 random access procedure, or a 2-step random access procedure known as Type-2 random access procedure as described in TS 38.213.

Figure 6A:
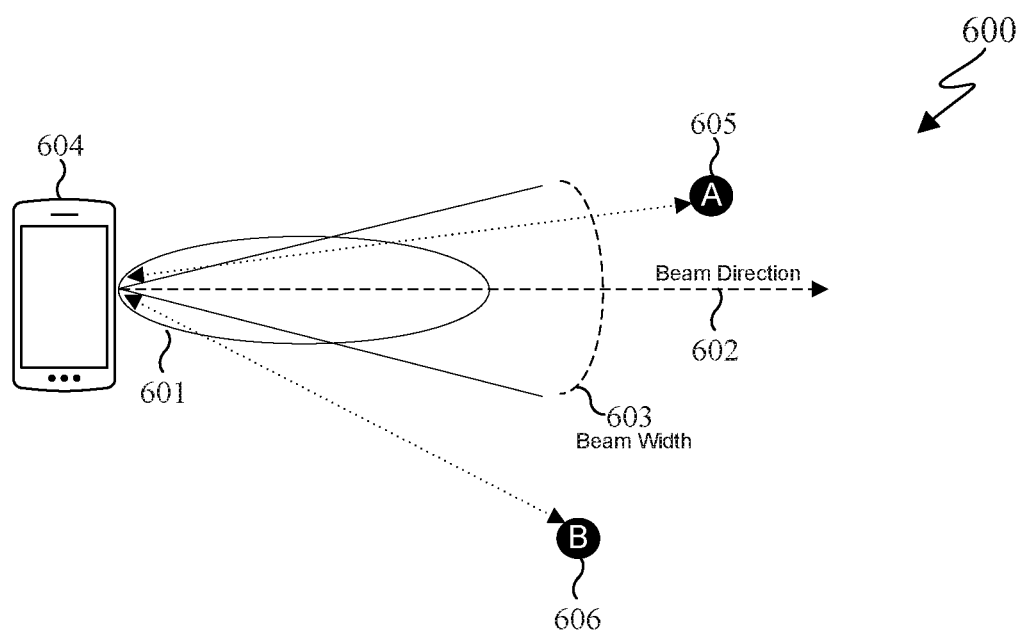
FIG. 6A illustrates an example of a beam in a wireless system according to embodiments of the present disclosure.

FIG. 6A illustrate an example of a beam in a wireless system 600 according to embodiments of the present disclosure. An embodiment of the beam shown in FIG. 6A is for illustration only and other embodiments can be used without departing from the scope of the present disclosure.

The wireless system 600 of FIG. 6A includes a beam 601 and a device 604. The device 604 can be similar to the UE 116. The beam 601, form the device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B 606 cannot receive from and transmit to device 604 as Point B is outside a beam width and direction of a beam 601 from device 604. While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
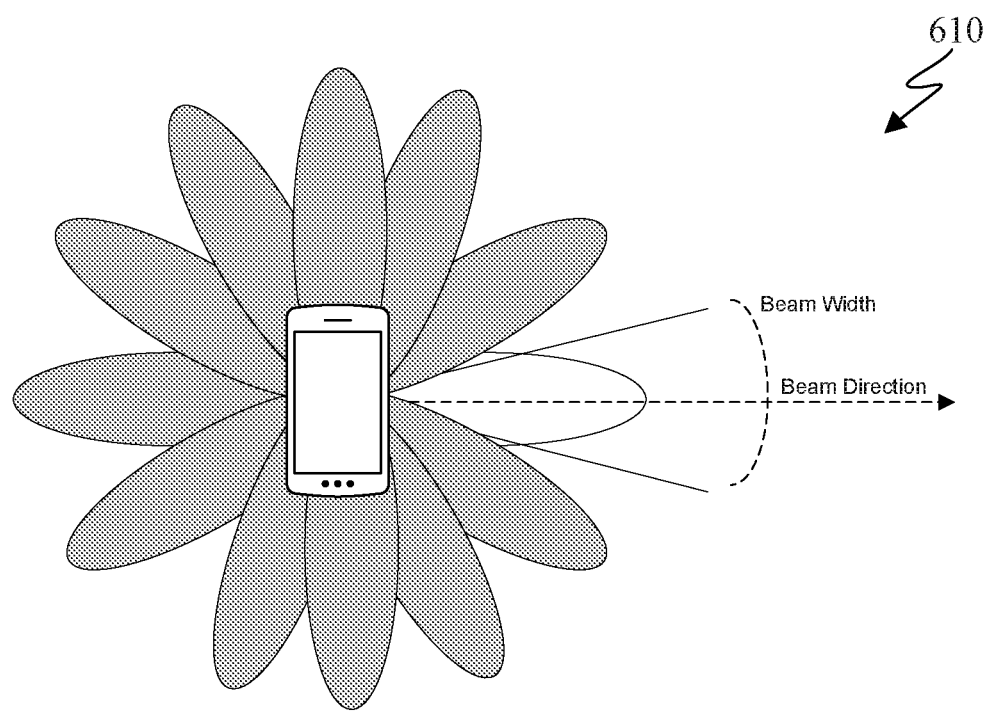
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only and other embodiments can be used without departing from the scope of the present disclosure. The multi-beam operation 650 of FIG. 6B includes a device, similar to the device 604 of FIG. 6A and multiple beams similar to the beam 601 of FIG. 6A. Although FIGS. 6A and 6B illustrate example beam operations, various changes may be made to FIGS. 6A and 6B. For example the width and direction of the beams may differ.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Certain electronic devices can support up to 32 CSI-RS antenna ports which enable an eNB or a gNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7, described in greater detail below.

Figure 7:
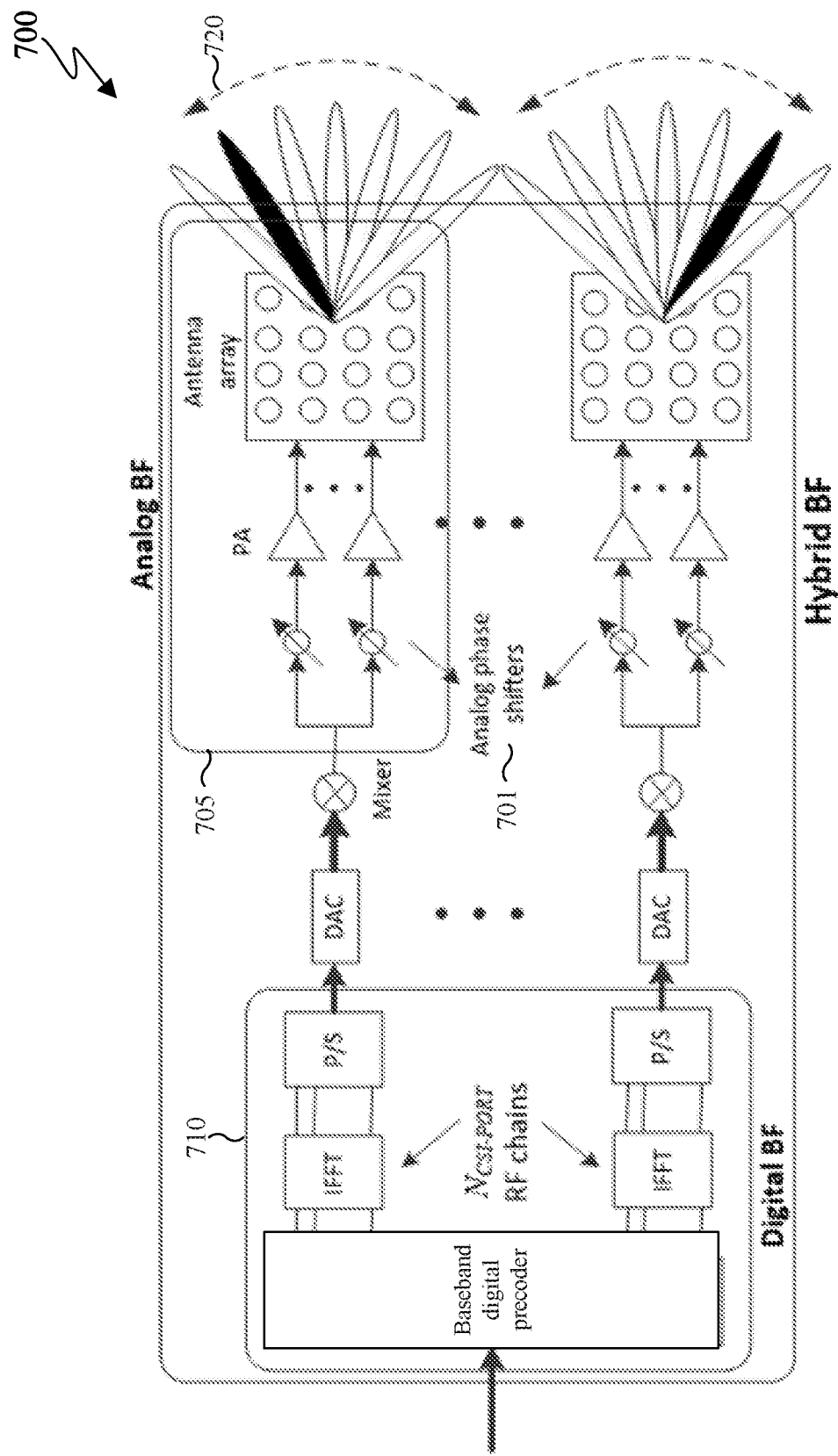
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only and other embodiments can be used without departing from the scope of the present disclosure. For example, the antenna structure 700 may be present in a wireless communication device, such as, for example, the UE 116 or the BS 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI\text{-}PORT}$. A digital beamforming unit 710 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The described system is also applicable to higher frequency bands such as >52.6 GHz. In this case, the system employs analog beams. Due to the O2 absorption loss around 60 GHz frequency (~10 dB additional loss @100m distance), larger number and narrower analog beams (hence larger number of radiators in the array) may be needed to compensate for the additional path loss.

A TCI DL control information (DCI) can be a dedicated channel for beam indication information (such as a purposed designed DL channel for beam indication). Beam indication information can also be included in a DL related DCI or in an UL related DCI. A DL related DCI can be a DCI Format 1_0, DCI Format 1_1, or DCI Format 1_2, with a DL assignment or without a DL assignment. A UL related DCI can be a DCI Format 0_0, DCI Format 0_1, or DCI Format 0_2, with a UL grant or without a UL grant. Embodiments of the present disclosure describe aspects related to beam management and beam determination after a channel setup after an initial access and after a random access procedure initiated by a reconfiguration with sync. For example, certain embodiments describe medium access control (MAC) control element (CE) activation of TCI states and DCI TCI state indication in conjunction with RRC TCI state configuration and beam determination during last random access channel (RACH) procedure when determining the UE's beam(s) for UL and DL channels after a channel setup or after a random access procedure initiated by reconfiguration with sync.

Embodiments of the present disclosure take into consideration that in release 15/16 a common framework can be shared for CSI and beam management, while the complexity of such framework is justified for CSI, it makes beam management procedures rather cumbersome, and less efficient. Efficiency here refers to overhead associated with beam management operations and latency for reporting and indicating new beams.

Embodiments of the present disclosure take also into consideration that in release 15/16 that beam management framework is different for different channels. This can increase the overhead of beam management, and could lead to less robust beam-based operation. For example, for physical DL control channel (PDCCH) the TCI state (used for beam indication), is updated through MAC CE signaling. While the TCI state of PDSCH can be updated through a DL DCI carrying the DL assignment with codepoints configured by MAC CE, or the PDSCH TCI state can follow that of the corresponding PDCCH, or use a default beam indication. In the UL direction, the spatialRelationInfo framework is used for beam indication for physical UL control channel (PUCCH) and SRS, which is updated through RRC and MAC CE signaling. For physical UL shared channel (PUSCH) the SRS Resource Indicator (SRI), in an UL DCI with UL grants, can be used for beam indication. Having different beam indications and beam indication update mechanisms increases the complexity, overhead and latency of beam management, and could lead to less robust beam-based operation.

Accordingly, embodiments of the present disclosure describe that to reduce the latency and overhead of beam indication, L1 based beam indication is described, wherein a TCI DCI is used for beam indication. A TCI DCI can be a dedicated channel for beam indication information, i.e. a purposed designed DL channel for beam indication. Beam indication information can also be included in a DL-related DCI or in an UL-related DCI. A DL related DCI can be a DCI Format 1_0, DCI Format 1_1, or DCI Format 1_2, with a DL assignment or without a DL assignment. A UL related DCI can be a DCI Format 0_0, DCI Format 0_1, or DCI Format 0_2, with a UL grant or without a UL grant. This disclosure describes design aspects related to beam management and beam determination after a channel setup after an initial access and after a random access procedure initiated by a reconfiguration with sync. This disclosure considers MAC CE activation of TCI states and DCI TCI state indication in conjunction with RRC TCI state configuration and beam determination during last RACH procedure when determining the UE's beam(s) for UL and DL channels after a channel setup or after a random access procedure initiated by reconfiguration with sync.

Accordingly, embodiments of the present disclosure describe design aspects related to beam management and beam determination after a channel setup after an initial access and after a random access procedure initiated by a reconfiguration with sync. Embodiments of the present disclosure also describe MAC CE activation of TCI states and DCI TCI state indication in conjunction with RRC TCI state configuration and beam determination during last RACH procedure when determining the UE's beam(s) for UL and DL channels after a channel setup or after a random access procedure initiated by reconfiguration with sync.

In the following, both frequency division duplexing (FDD) and time division duplexing (TDD) are considered as a duplex method for DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure considers several components that can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated or is otherwise specified in the system operation or is configured by higher layers. Upon successfully decoding the signal, the UE responds according to an indication provided by the signal.

Similarly, the term "deactivation" describes an operation wherein a UE receives and decodes a signal from the network (or gNB) that signifies a stopping point in time. The stopping point can be a present or a future slot/subframe or symbol and the exact location is either implicitly or explicitly indicated or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a DL signal such as non-zero power (NZP) CSI-RS and/or SSB) and the UE can use the result of the measurement for calculating a beam report (a beam report includes at least one L1 reference signal received power (RSRP) accompanied by at least one CRI). Using the received beam report, the NW/gNB can assign a particular DL TX beam to the UE. A reference RS can also be transmitted by the UE (for example, the reference RS is an UL signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a DL signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an UL signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS or can be a combination of such configuration and activation/deactivation in case of semi-persistent RS.

For mmWave bands (or frequency range 2 (FR2)) or for higher frequency bands (such as >52.6 GHz) (or for FR2-1 for 24.25-52.6 GHz, and FR2-2 for 52.6-71 GHz (two ranges under the FR2 common range)) where multi-beam operation is especially relevant, a transmission-reception process includes a receiver selecting a RX beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam.

In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs. Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

Figure 8:
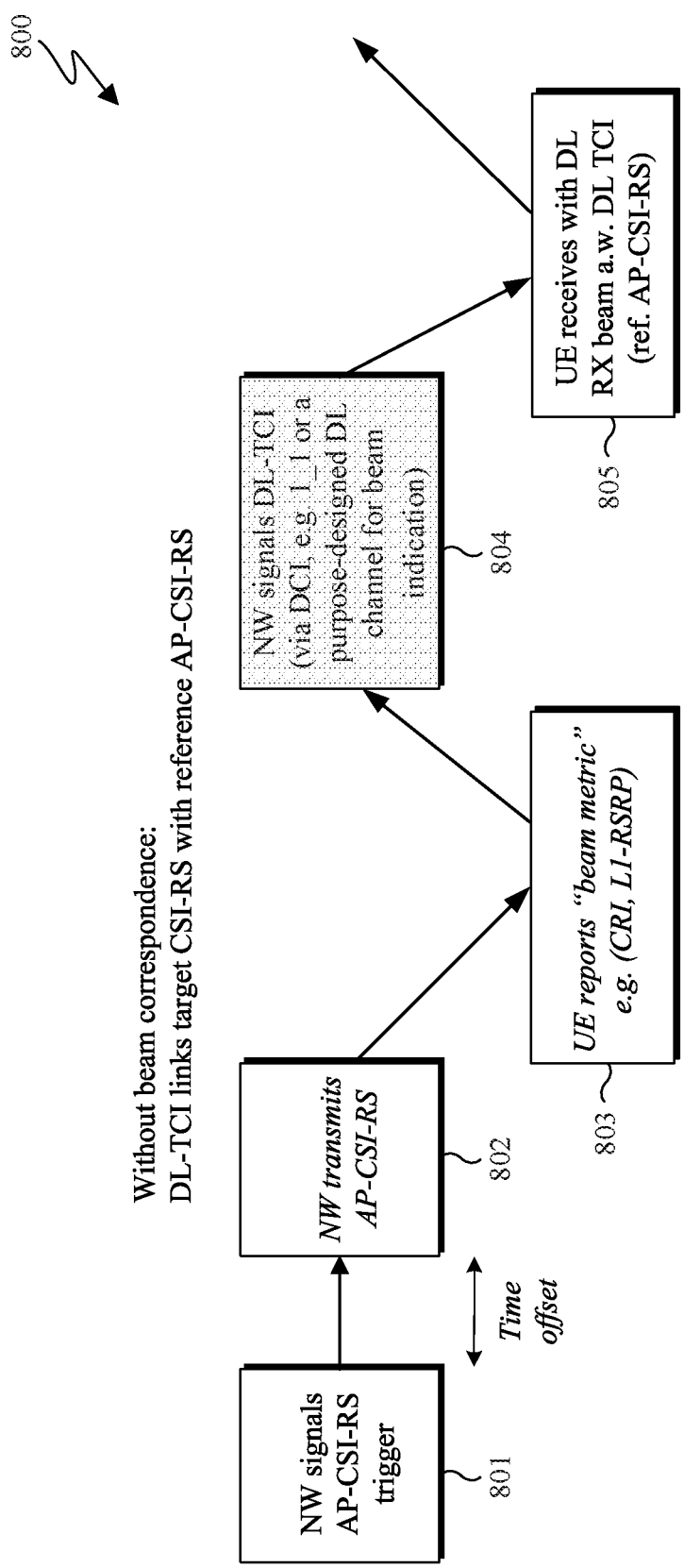
FIG. 8 illustrates an example downlink (DL) multi-beam operation according to embodiments of the present disclosure.
Figure 9:
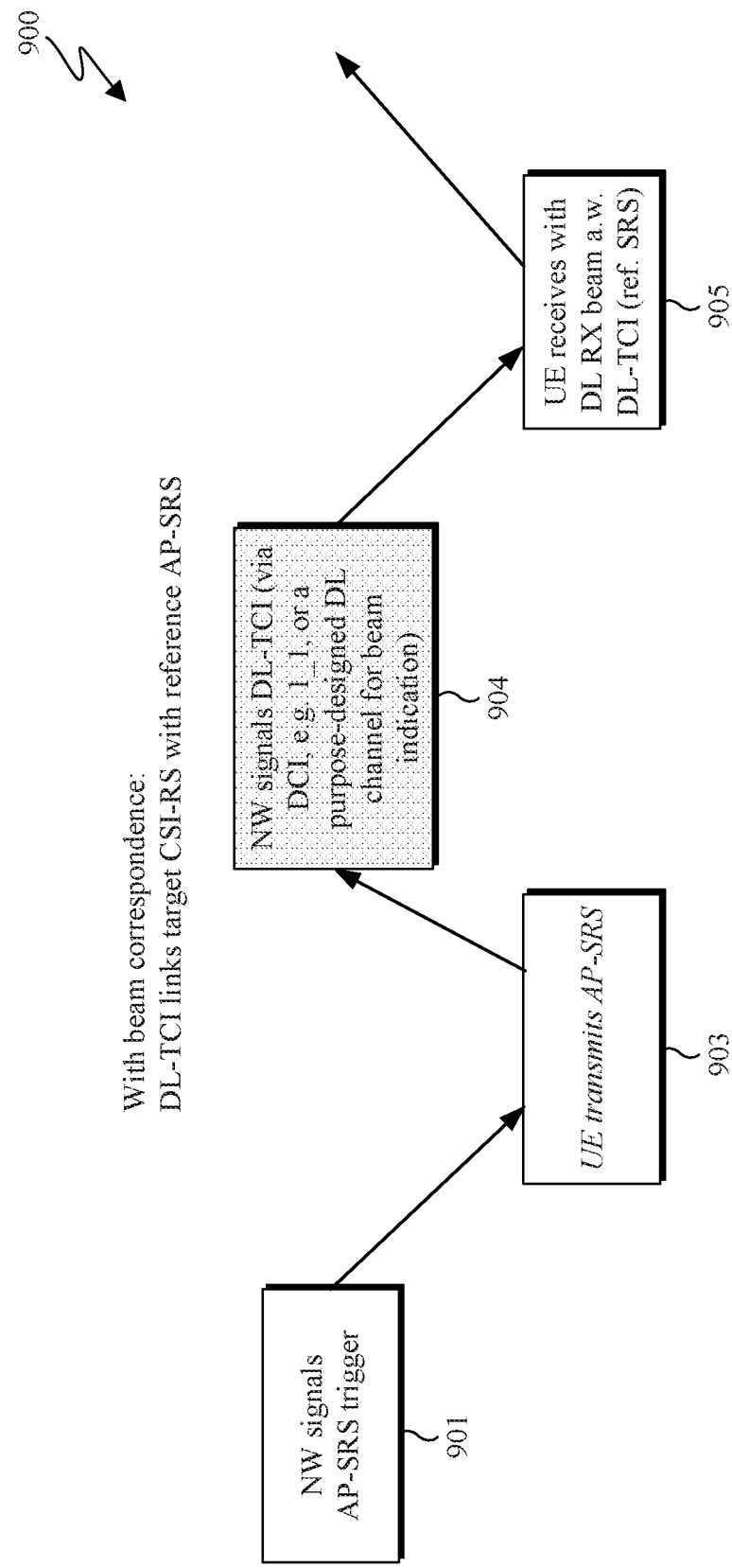
FIG. 9 illustrates another example DL multi-beam operation according to embodiments of the present disclosure.

The following two embodiments (as shown in FIG. 8 and as shown in FIG. 9) are examples of DL multi-beam operations that utilize DL-TCI-state based DL beam indication. In the first example embodiment (as shown in FIG. 8), an aperiodic CSI-RS is transmitted by the NW/gNB and received/measured by the UE. This embodiment can be used regardless of whether or not there is UL-DL beam correspondence. In the second example embodiment (as shown in FIG. 9), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

FIG. 8 illustrates an example DL multi-beam operation 800 according to embodiments of the present disclosure. The embodiment of the DL multi-beam operation 800 shown in FIG. 8 is for illustration only and other embodiments can be used without departing from the scope of the present disclosure.

In one example illustrated in FIG. 8, a DL multi-beam operation 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated layer 1-received signal received power (L1-RSRP)/L1-received signal received quality (L1 reference signal received quality (RSRQ))/L1-signal to interference ratio (L1 signal-to-noise and interference ratio (SINR))/channel quality indicator (CQI).

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) set while a UE-group common DL channel can be a PDCCH that a UE receives according to a common search space (CSS) set. In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

As shown in FIG. 8 and as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

FIG. 9 illustrates another example DL multi-beam operation 900 according to embodiments of the present disclosure. An embodiment of the UL multi-beam operation 900 shown in FIG. 9 is for illustration only and other embodiments can be used without departing from the scope of the present disclosure.

In another example illustrated in FIG. 9, an DL multi-beam operation 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set. In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

As shown in FIG. 9 and described above, the UE selects the DL RX beam based on the UL TX beam associated with the reference RS (AP-SRS) index signaled via the TCI-state field.

Similar, for an UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RS s, either per reference RS or by "beam sweeping," and determine all the TX-RX beam pairs associated with all the reference RS s configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

Figure 10:
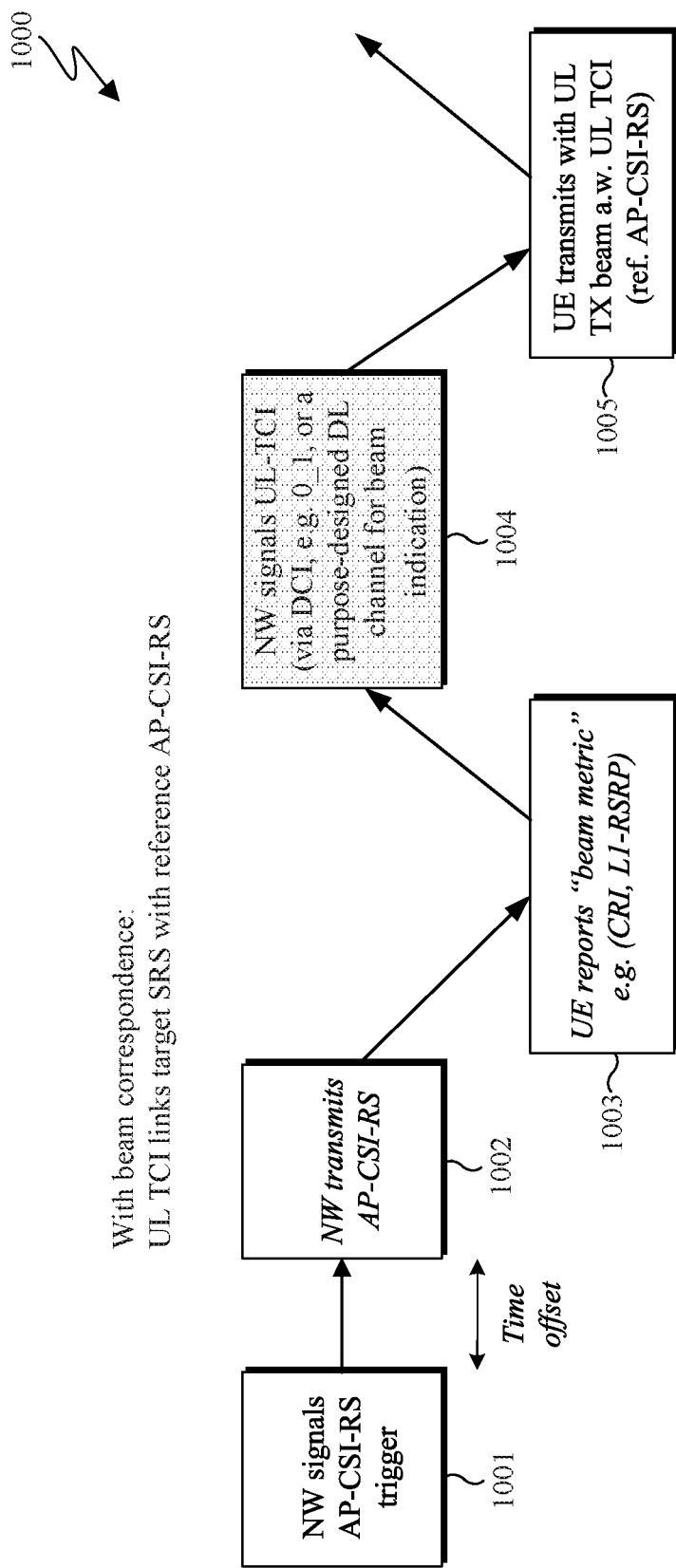
FIG. 10 illustrates an example uplink (UL) multi-beam operation according to embodiments of the present disclosure.
Figure 11:
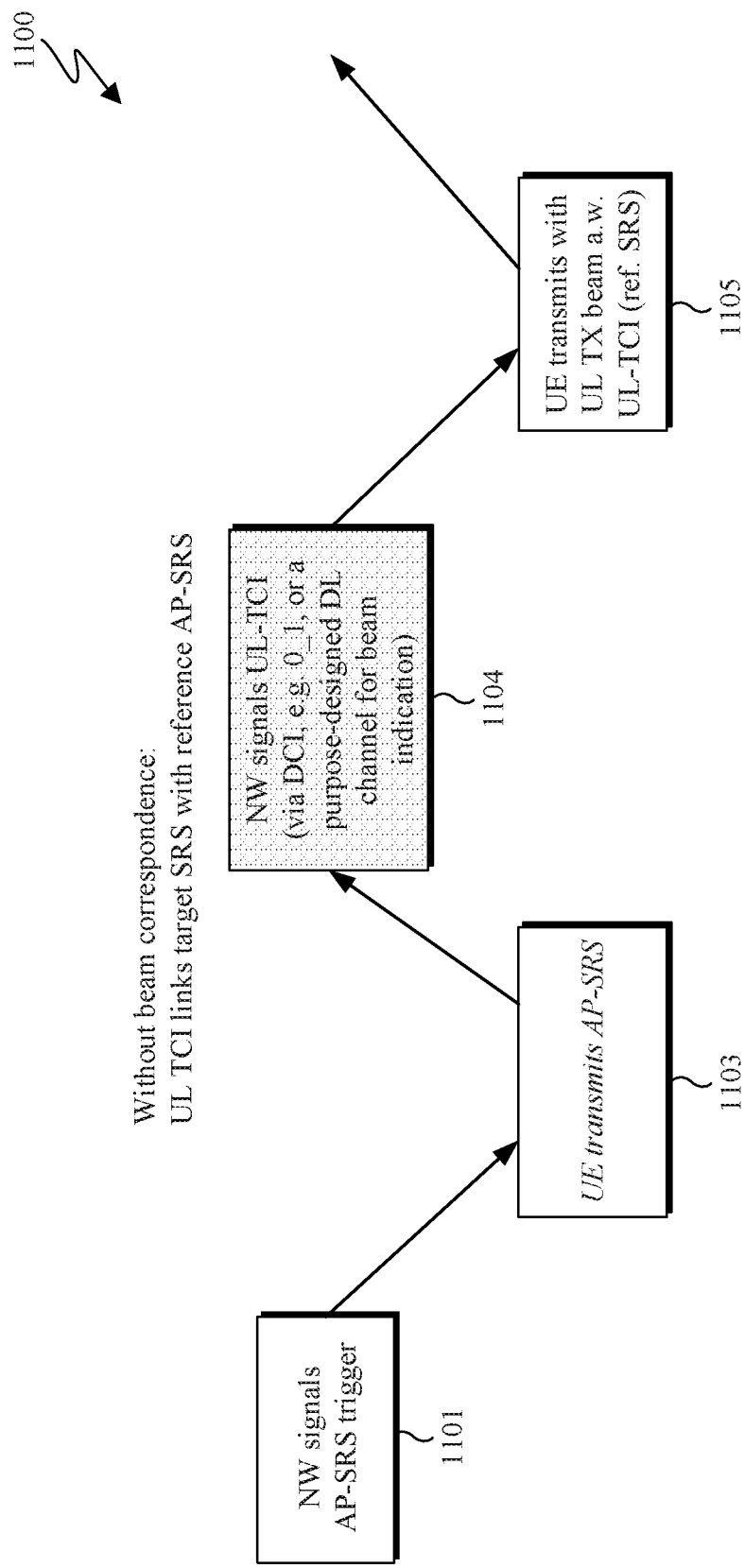
FIG. 11 illustrates another example UL multi-beam operation according to embodiments of the present disclosure.

The following two embodiments (as shown in FIGS. 10 and 11) are examples of UL multi-beam operations that utilize TCI-based UL beam indication after the network (NW) receives a transmission from the UE. In the first example embodiment (as shown in FIG. 10), a NW transmits an aperiodic CSI-RS, and a UE receives and measures the CSI-RS. This embodiment can be used, for instance, at least when there is reciprocity between the UL and DL beam-pair-link (BPL). This condition is termed "UL-DL beam correspondence." In the second example embodiment (as shown in FIG. 11), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

FIG. 10 illustrates an example UL multi-beam operation 1000 according to embodiments of the present disclosure. An embodiment of the UL multi-beam operation 1000 shown in FIG. 10 is for illustration only and other embodiments can be used without departing from the scope of the present disclosure.

In one example illustrated in FIG. 10, an UL multi-beam operation 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CRI or SSB-RI together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set. In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1005).

As shown in FIG. 10 and described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

FIG. 11 illustrates another example UL multi-beam operation 1100 according to embodiments of the present disclosure. An embodiment of the UL multi-beam operation 1100 shown in FIG. 11 is for illustration only and other embodiments can be used without departing from the scope of the present disclosure.

In another example illustrated in FIG. 11, an UL multi-beam operation 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

As shown in FIG. 11 and described above, the UE selects the UL TX beam from the reference RS (in this case SRS) index signaled via the value of the TCI-state field.

Figure 12:
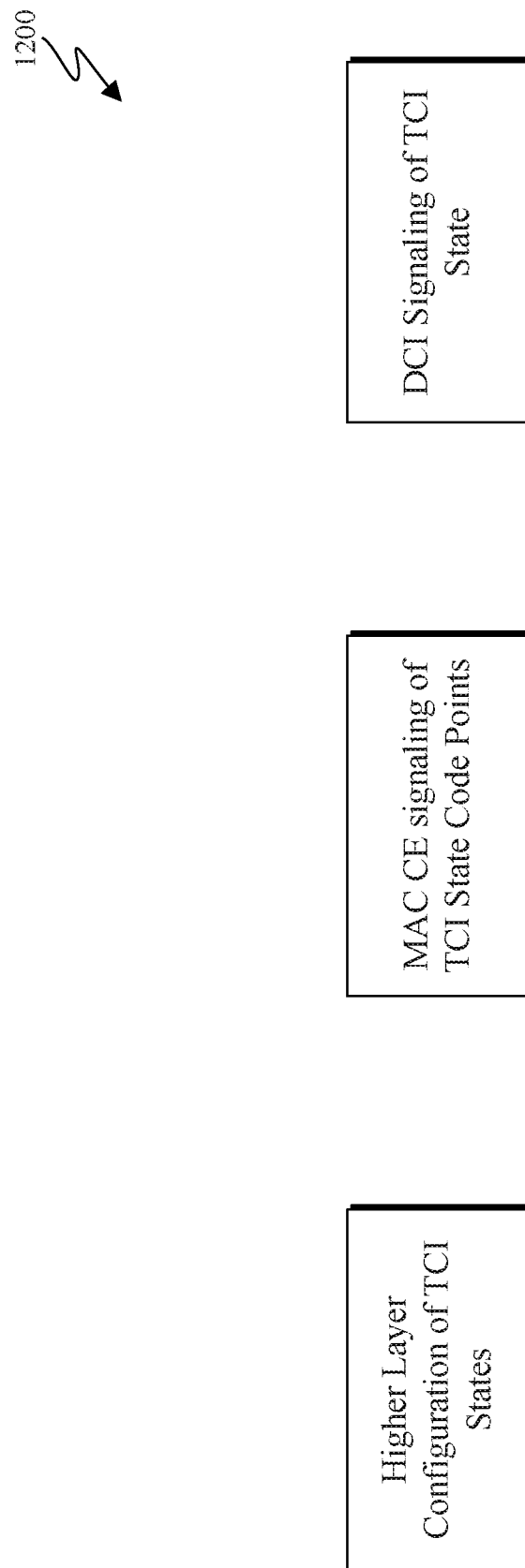
FIG. 12 illustrates a block diagram describing examples of a UE that is configured or updated through higher layer RRC signaling according to embodiments of the present disclosure.

FIG. 12 illustrates a block diagram 1200 describing examples of a UE that is configured or updated through higher layer RRC signaling according to embodiments of the present disclosure. The UE of FIG. 12 can be similar to any of the UEs 111-116 of FIG. 1, such as the UE 116 of FIG. 3.

The components as shown in the block diagram 1200, describe that a TCI state is used for beam indication. It can refer to a DL TCI state for DL channels (such as PDCCH and PDSCH) or DL signals (such as CSI-RS), an UL TCI state for UL channels (such as PUSCH and PUCCH) or UL signals (such SRS), a joint TCI state for DL and UL channels or signals, or separate TCI states for UL and DL channels or signals. A TCI state can be common across multiple component carriers or can be a separate TCI state for a component carrier or a set of component carriers. A TCI state can be gNB or UE panel specific or common across panels. In some examples, the UL TCI state can be replaced by an SRI or spatial relation information.

For example, as shown in FIG. 12 a UE is configured/updated through higher layer RRC signaling (configuration) a set of TCI States with N elements. MAC CE signaling (activation) includes a subset of M (M≤N) TCI states from the set of N TCI states, wherein each TCI state is associated with a code point of the DCI field used for indication of the TCI state. L1 control signaling (indication) (i.e. DL Control Information (DCI)) updates the UE's TCI state, wherein the DCI includes a TCI State field such as with m bits (such that M≤$2^m$), the TCI state corresponds to a code point signaled by MAC CE.

When a DL channel is quasi-co-located (QCLed) with an UL reference signal, this indicates that the spatial filter for the reception of the DL channel at the UE is determined based on the spatial filter used for the transmission of the UL reference signal at the UE. When an UL channel is QCLed with a DL reference signal, this indicates that the spatial filter for the transmission of the UL channel at the UE is determined based on the spatial filter used for the reception of the DL reference signal at the UE.

In the following embodiments, when is a configured with one TCI State, or activated with one TCI state or indicated one TCI state. The configured, activated, or indicated TCI state is applied after a corresponding beam application delay or latency from the time of the acknowledgment of message carrying the configuration, activation, or indication of the TCI state.

Embodiments of the present disclosure describe a TCI state configuration and signaling after initial access. The following examples and embodiments, such as those of FIGS. 13 and 14, describe a TCI state configuration and signaling after initial access.

Figure 13:
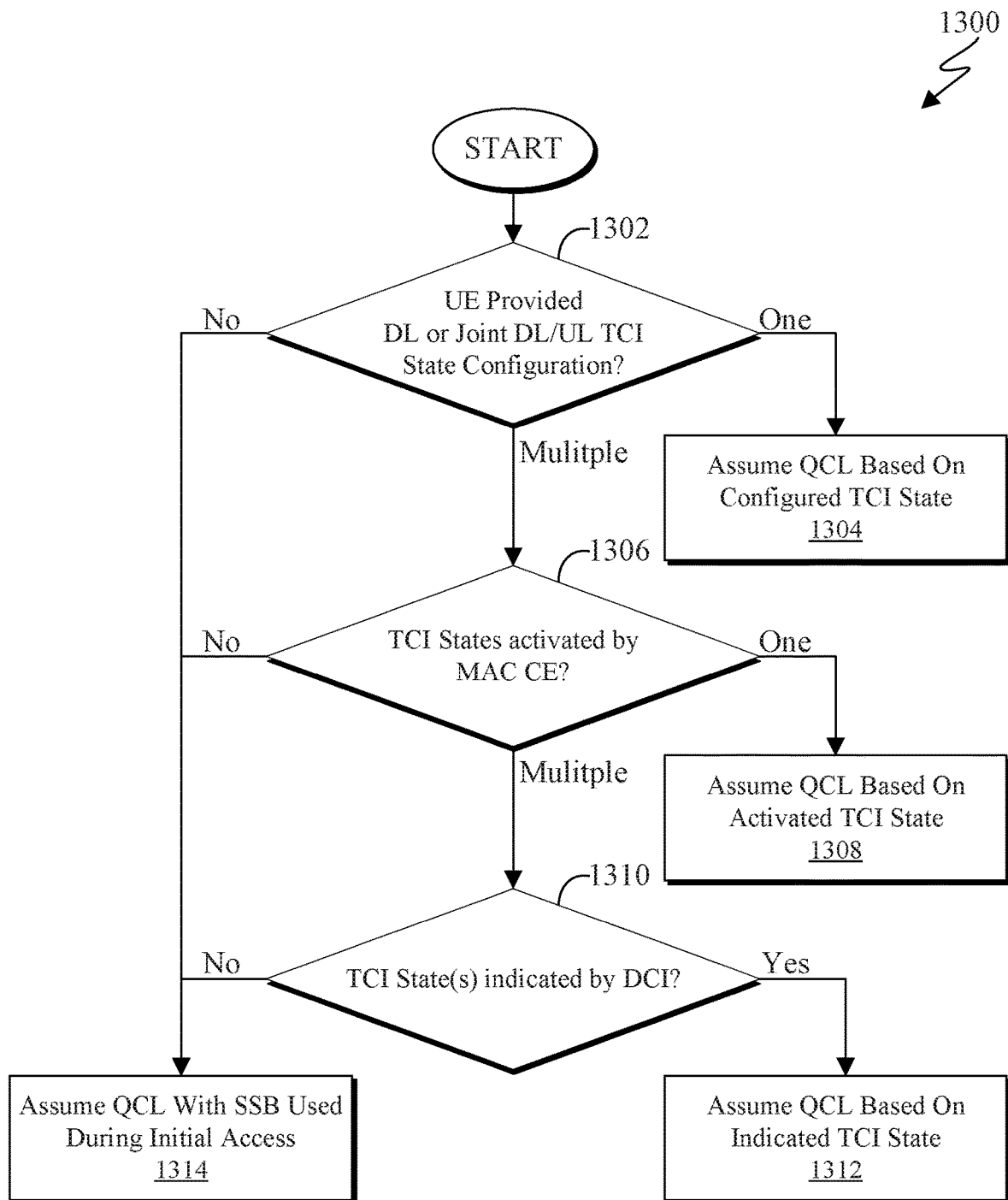
FIGS. 13 and 14 illustrate a flowchart of a UE determining quasi-colocation (QCL) assumptions for a demodulation reference signal (DM-RS) antenna port after initial access according to embodiments of the present disclosure.
Figure 14:
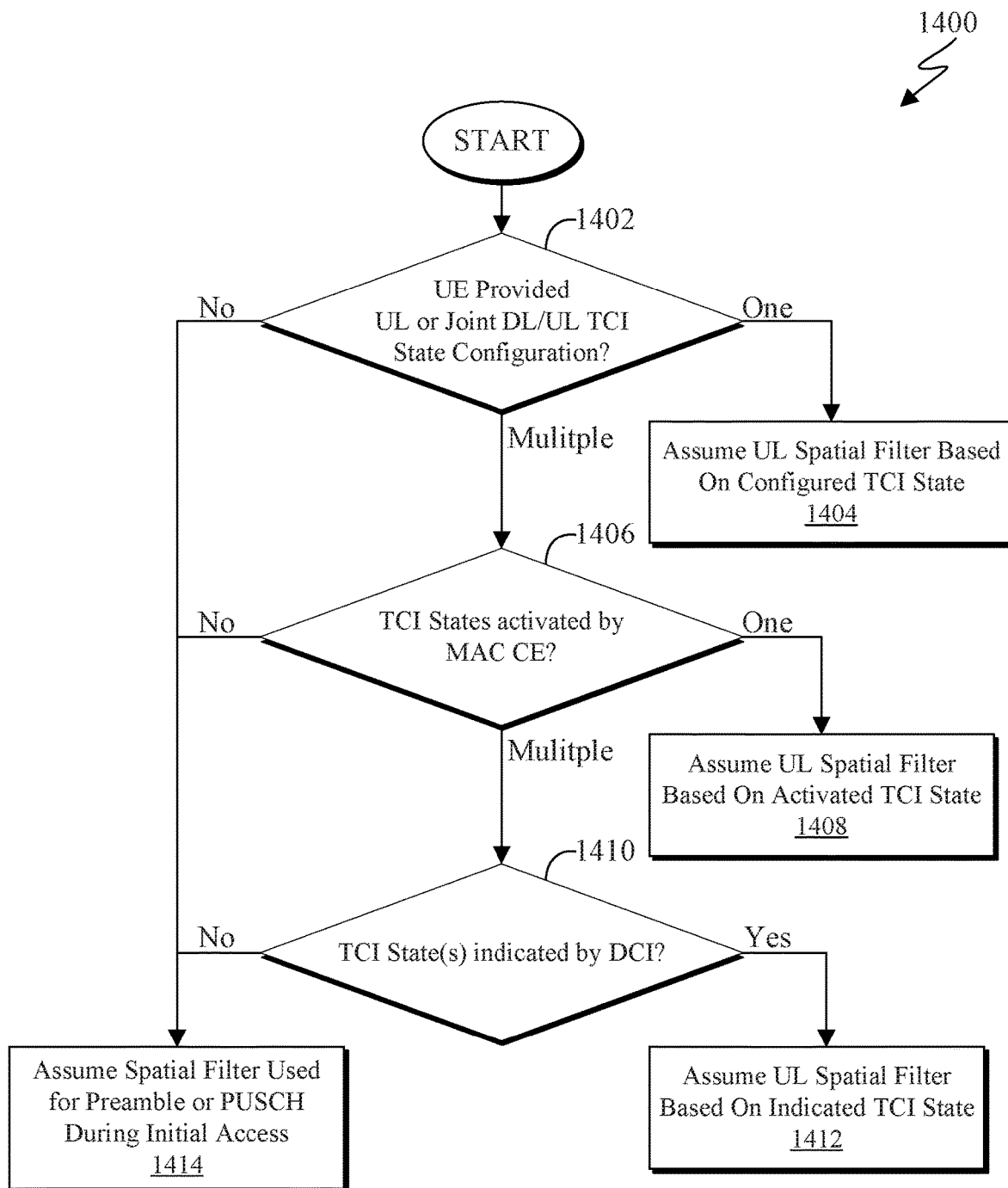

FIGS. 13 and 14 illustrate flowcharts 1300 and 1400, respectively, describing a UE determining quasi-colocation (QCL) assumptions for a demodulation reference signal (DM-RS) antenna port after initial access according to embodiments of the present disclosure. In particular, FIG. 13 illustrates the flowchart 1300 of a UE determining a QCL assumption for a DM-RS antenna port associated with a DL channel (such as a UE specific DL channel) (e.g., PDSCH or PDCCH) after initial access according to embodiments of the present disclosure. FIG. 14 illustrates the flowchart 1400 of a UE determining a QCL assumption for a DM-RS antenna port associated with an UL channel (such as a UE specific UL channel) (e.g., PUSCH or PUCCH) after initial access according to embodiments of the present disclosure. The steps of the flowchart 1300 and the flowchart 1400 can be performed by any of the UEs 111-116 of FIG. 1, such as the UE 116 of FIG. 3, as well as any of the BSs 101-103 of FIG. 1, such as the BS 102 of FIG. 2. The flowchart 1300 of FIG. 13 and the flowchart 1400 of FIG. 14 are for illustration only and other embodiments can be used without departing from the scope of the present disclosure.

In certain embodiments, during initial access a UE (such as the UE 116) can find a beam to communicate on with the base station. A beam can be associated with a Synchronization Signal Physical Broadcast Channel (PBCH) Block—SS/PBCH Block or SSB for short or a CSI-RS or UL reference signal, such as an SRS. For DL receptions and before a UE has been provided a configuration of DL TCI states or Joint DL/UL TCI states, the UE assumes that the DM-RS antenna port associated with a DL channel (such as PDCCH or PDSCH) is quasi-co-located (QCLed) with the SSB or CSI-RS or SRS the UE used during the most recent random access procedure for initial access or last transmission prior to the UE getting a cell radio network temporary identifier (C-RNTI). In contrast, for UL transmissions and before a UE has been provided a configuration of UL TCI states or joint DL/UL TCI states or UL spatial relations, the UE assumes that the DM-RS antenna port associated with an UL channel (such as PUSCH or PUCCH) is quasi-co-located with or follows a spatial filter associated with the physical random access channel (PRACH) signal or SRS or SSB or CSI-RS used during the most recent random access procedure for initial access or last transmission (e.g., last PUSCH transmission triggered by or associated with the random access procedure such as a PUSCH transmission scheduled by the random access response (RAR)) prior to the UE getting a C-RNTI.

As shown in FIG. 13, in step 1302, a UE (such as the UE 116) checks (determines) if it has been provided with DL TCI state configuration or joint DL/UL TCI state configuration.

Upon a determination that the UE is provided with a TCI state configuration with a single TCI state, then the UE, in step 1304, assumes that the QCL assumption for the DM-RS antenna port associated with a DL channel (e.g., PDSCH or PSCCH) is based on the configured TCI state. It is noted that the configured TCI state can be a DL TCI state or a joint DL/UL TCI state. Alternatively, if the UE is not provided a TCI state configuration, then in step 1314, the UE assumes that the DM-RS antenna port associated with a DL channel (e.g., PDSCH or PSCCH) is QCLed with the SSB or CSI-RS or SRS the UE used during the most recent random access procedure for initial access or last transmission prior to the UE getting a C-RNTI.

The UE can also determine that it is provided with a TCI state configuration with multiple DL TCI states, and/or a TCI state configuration with multiple joint DL/UL TCI states (step 1302). Upon determining that multiple DL and/or joint DL/UL TCI state configurations, then in step 1306, the UE checks if TCI state(s) have been activated by a MAC CE.

Upon determining that a single TCI state is activated by MAC CE, in step 1308, the UE assumes that the QCL assumption for the DM-RS antenna port associated with a DL channel (e.g., PDSCH or PSCCH) is based on the activated TCI state. It is noted that the activated TCI state can be a DL TCI state or a joint DL/UL TCI state. Alternatively, if the UE is not provided a TCI state MAC CE activation command, then in step 1314, the UE assumes that the DM-RS antenna port associated with a DL channel (e.g., PDSCH or PSCCH) is QCLed with the SSB or CSI-RS or SRS the UE used during the most recent random access procedure for initial access or last transmission prior to the UE getting a C-RNTI.

If a UE is provided a MAC CE TCI state activation command with (i) multiple DL TCI states, (ii) a TCI state configuration with multiple joint DL/UL TCI states, or both, then the UE checks if TCI state(s) has been activated by a DCI (step 1310).

Upon determining that the UE is indicated a TCI state(s) in a DCI, then in step 1312, the UE assumes that the QCL assumption for the DM-RS antenna port associated with a DL channel (e.g., PDSCH or PSCCH) is based on the indicated TCI state(s). It is noted indicated TCI state can be a DL TCI state or a joint DL/UL TCI state. Alternatively, if the UE is not provided a DCI with a TCI state, the UE assumes that the DM-RS antenna port associated with a DL channel (e.g., PDSCH or PSCCH) is QCLed with the SSB or CSI-RS or SRS the UE used during the most recent random access procedure for initial access or last transmission prior to the UE getting a C-RNTI (step 1314).

As shown in FIG. 14, in step 1402, a UE (such as the UE 116) determines if it has been provided with UL TCI state configuration or joint DL/UL TCI state configuration or UL spatial relation.

Upon a determination that the UE is provided with a TCI state configuration with a single TCI state or spatial relation, the UE, in step 1404, assumes that the QCL assumption or spatial relation for the DM-RS antenna port associated with an UL channel (e.g., PUSCH or PUCCH) is based on the configured TCI state. The configured TCI state can be a UL TCI state or a joint DL/UL TCI state or UL spatial relation. Alternatively, if the UE is not provided a TCI state configuration or spatial relation configuration, the UE, in step 1414, assumes that the DM-RS antenna port associated with an UL channel (e.g., PUSCH or PUCCH) is QCLed with or follows a spatial filter associated with the PRACH signal or SRS or SSB or CSI-RS used during the most recent random access procedure for initial access or last transmission (e.g., last PUSCH transmission triggered by or associated with the random access procedure such as a PUSCH transmission scheduled by the random access response (RAR)) prior to the UE getting a C-RNTI.

The UE can also determine that it is provided with a TCI state configuration with multiple UL TCI states, and/or a TCI state configuration with multiple joint DL/UL TCI states and/or multiple UL spatial relations (step 1402). Upon determining that multiple UL and/or joint DL/UL TCI state and/or multiple UL spatial relations, then in step 1406, the UE checks if TCI state(s) and/or UL spatial relations have been activated by a MAC CE.

Upon determining that a single TCI state or UL spatial relation is activated by MAC CE, the UE in step 1408 assumes that the QCL assumption for the DM-RS antenna port associated with an UL channel (e.g., PUSCH or PUCCH) is based on the activated TCI state. The activated TCI state can be a UL TCI state or a joint DL/UL TCI state or UL spatial relation. Alternatively, if the UE is not provided a TCI state or spatial relation MAC CE activation command, the UE in step 1414 assumes that the DM-RS antenna port associated with an UL channel (e.g., PUSCH or PUCCH) is QCLed with or follows a spatial filter associated with the PRACH signal or SRS or SSB or CSI-RS used during the most recent random access procedure for initial access or last transmission (e.g., last PUSCH transmission triggered by or associated with the random access procedure such as a PUSCH transmission scheduled by the random access response (RAR)) prior to the UE getting a C-RNTI.

If the UE is provided with (i) a MAC CE TCI state, (ii) a spatial relation activation command with multiple UL TCI states, (iii) a TCI state configuration with multiple joint DL/UL TCI states, (iv) multiple UL spatial relations, or any combination thereof, then the UE checks if TCI state(s) and/or spatial relation(s) has been activated by a DCI (step 1410).

Upon determining that the UE is indicated a TCI state(s) or spatial relation(s) in a DCI, then in step 1412, the UE assumes that the QCL assumption for the DM-RS antenna port associated with an UL channel (e.g., PUSCH or PUCCH) is based on the indicated TCI state(s) or spatial relation(s). The indicated TCI state can be a UL TCI state or a joint DL/UL TCI state or spatial relation. Alternatively, if the UE is not provided a DCI with a TCI state, the UE assumes that the DM-RS antenna port associated with an UL channel (e.g., PUSCH or PUCCH) is QCLed with or follows a spatial filter associated with the PRACH signal or SRS or SSB or CSI-RS used during the most recent random access procedure for initial access or last transmission (e.g., last PUSCH transmission triggered by or associated with the random access procedure such as a PUSCH transmission scheduled by the random access response (RAR)) prior to a UE getting a C-RNTI (step 1414).

Although FIGS. 13 and 14 illustrate the flowcharts 1300 and 1400 various changes may be made to FIGS. 13 and 14. For example, while the flowchart 1300 of FIG. 13 and the flowchart 1400 of FIG. 14 are shown as a series of steps, various steps could overlap, occur in parallel, occur in a different order, or occur multiple times. In another example, steps may be omitted or replaced by other steps. For example, steps of the flowchart 1300 can be executed in a different order.

Embodiments of the present disclosure describe a TCI state configuration and signaling after a reconfiguration with sync. The following examples and embodiments, such as those of FIGS. 15 and 16, describe a TCI state configuration and signaling after a reconfiguration with sync.

Figure 15:
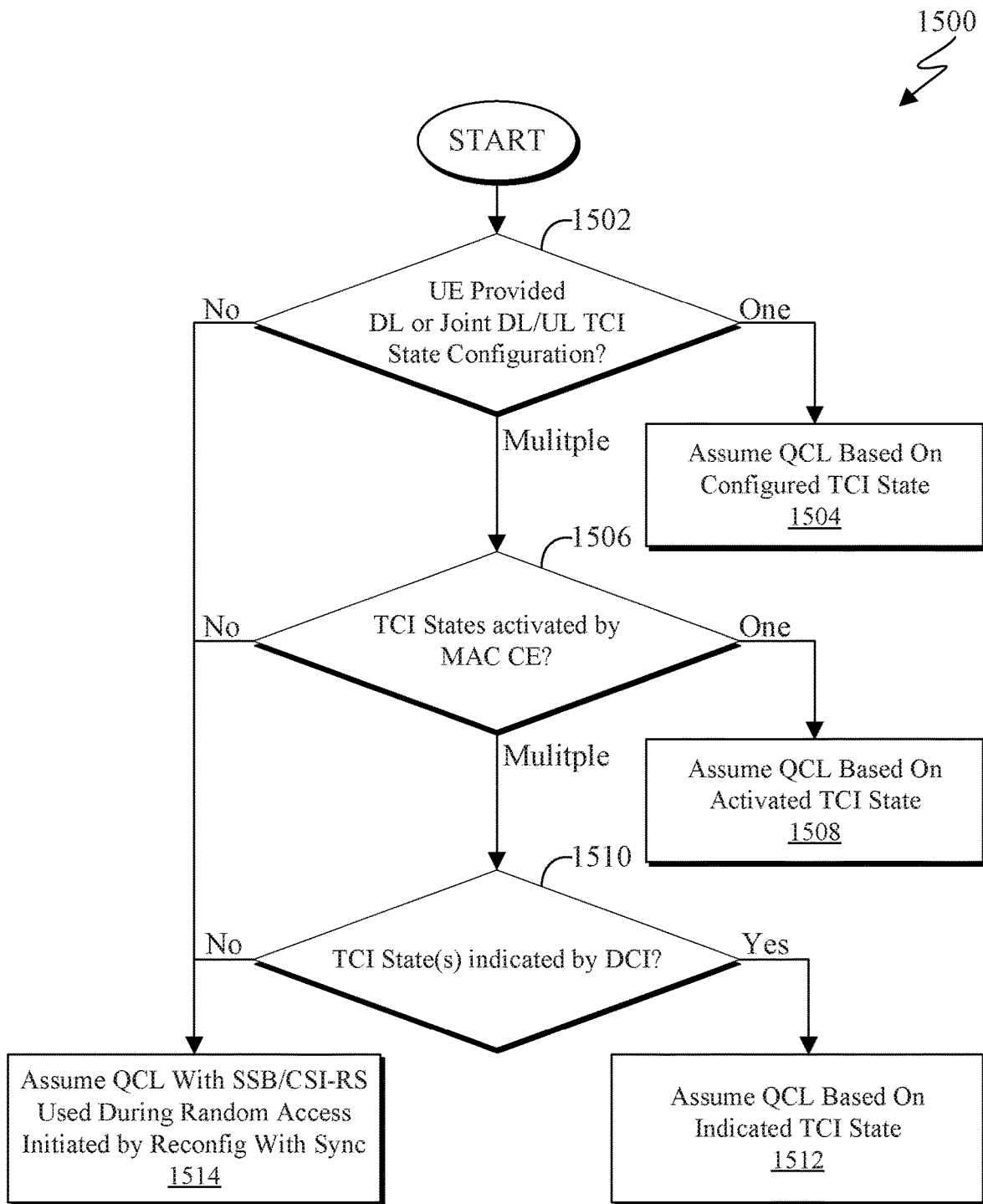
FIGS. 15 and 16 illustrate a flowchart of a UE determining QCL assumptions for a DM-RS antenna port after reconfiguration with sync according to embodiments of the present disclosure.
Figure 16:
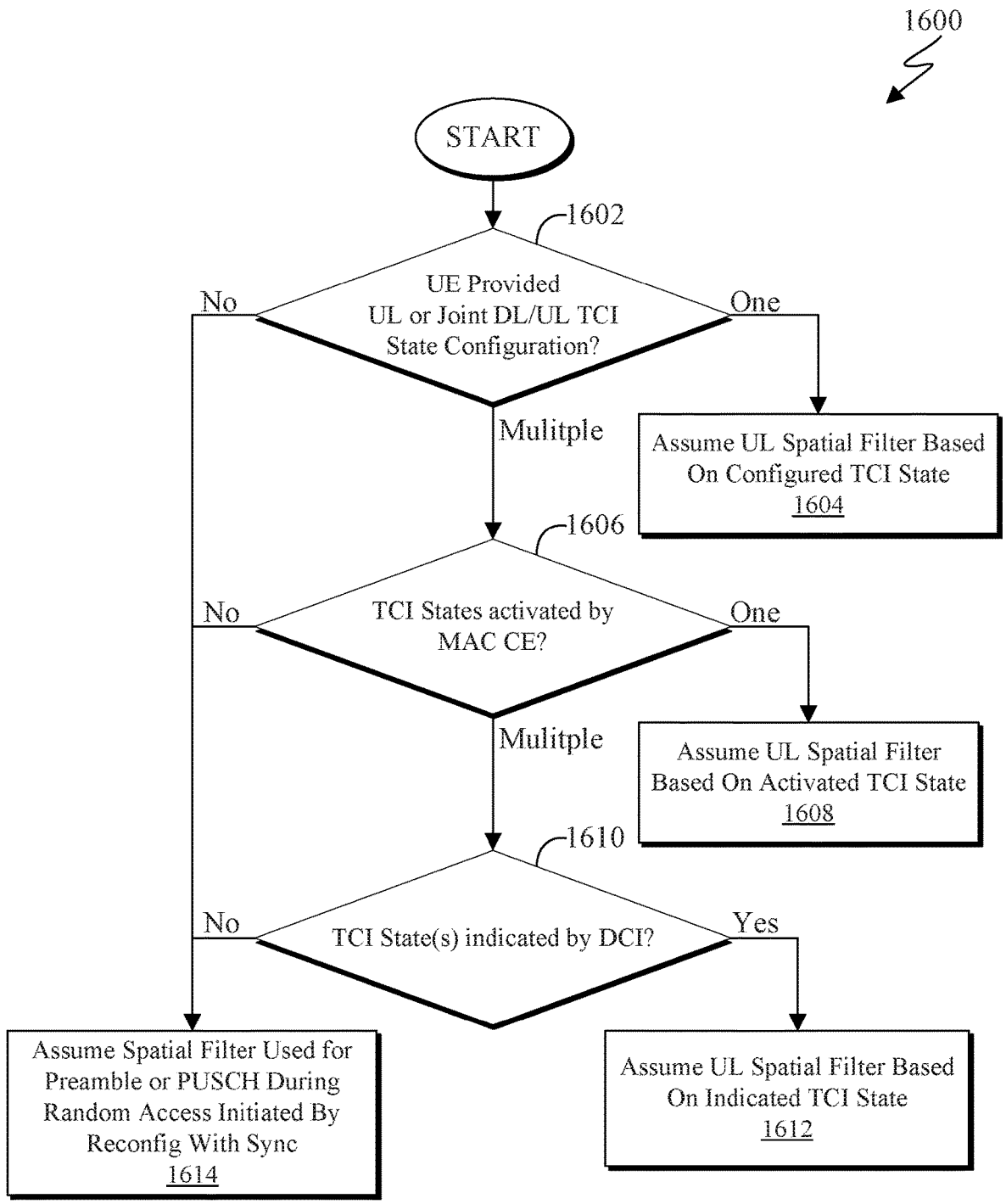

FIGS. 15 and 16 illustrate flowcharts 1500 and 1600, respectively, describing a UE determining QCL assumptions for a DM-RS antenna port after reconfiguration with sync according to embodiments of the present disclosure. In particular, FIG. 15 illustrates the flowchart 1500 describing how a UE determines a QCL assumption for the DM-RS antenna port associated with a DL channel (such as a UE specific DL channel) (e.g., PDSCH or PDCCH) after a reconfiguration with sync. FIG. 16 illustrates the flowchart 1600 describing how a UE determines a QCL assumption for the DM-RS antenna port associated with an UL channel (such as a UE specific UL channel) (e.g., PUSCH or PUCCH) after a reconfiguration with sync. The steps of the flowchart 1500 and the flowchart 1600 can be performed by any of the UEs 111-116 of FIG. 1, such as the UE 116 of FIG. 3, as well as any of the BSs 101-103 of FIG. 1, such as the BS 102 of FIG. 2. The flowchart 1500 of FIG. 15 and the flowchart 1600 of FIG. 16 are for illustration only and other embodiments can be used without departing from the scope of the present disclosure.

In certain embodiments, a random access procedure can be initiated by a Reconfiguration with Sync. During the random access procedure, a UE (such as the UE 116) can find a beam to communicate on with the base station. A beam can be associated with a SSB or a CSI-RS or an SRS identified during the random access procedure. For DL receptions after a Reconfiguration with sync and before a UE has been provided a configuration of DL TCI states or Joint DL/UL TCI states, the UE can assume that the DM-RS antenna port associated with a DL channel (such as PDCCH or PDSCH) is quasi-co-located (QCLed) with the SSB or CSI-RS or SRS the UE used during the most recent random access procedure initiated by Reconfiguration with sync or last transmission. In contrast, for UL transmissions after a Reconfiguration with sync and before a UE has been provided a configuration of UL TCI states or joint DL/UL TCI states or UL spatial relations, the UE can assume that the DM-RS antenna port associated with an UL channel (such as PUSCH or PUCCH) is quasi-co-located with or follows a spatial filter associated with the PRACH signal or SRS or SSB or CSI-RS used during the most recent random access procedure initiated by Reconfiguration with sync or last transmission (e.g., last PUSCH transmission triggered by or associated with the random access procedure such as a PUSCH transmission scheduled by the random access response (RAR)).

As shown in FIG. 15, in step 1502, a UE (such as the UE 116) checks (determines) if it has been provided with DL TCI state configuration or joint DL/UL TCI state configuration.

Upon a determination that the UE is provided with a TCI state configuration with a single TCI state, then the UE, in step 1504, assumes that the QCL assumption for the DM-RS antenna port associated with a DL channel (e.g., PDSCH or PDCCH) is based on the configured TCI state. It is noted that the configured TCI state can be a DL TCI state or a joint DL/UL TCI state. Alternatively, if the UE is not provided a TCI state configuration, then the UE, in step 1514, assumes that the DM-RS antenna port associated with a DL channel (e.g., PDSCH or PDCCH) is QCLed with the SSB or CSI-RS or SRS the UE used during the most recent random access procedure initiated by Reconfiguration with sync or last transmission.

The UE can also determine that it is provided with a TCI state configuration with multiple DL TCI states, and/or a TCI state configuration with multiple joint DL/UL TCI states (step 1502). Upon determining that multiple DL and/or joint DL/UL TCI state configurations, then in step 1506, the UE checks if TCI state(s) have been activated by a MAC CE.

Upon determining that a single TCI state is activated by MAC CE, in step 1508, the UE assumes that the QCL assumption for the DM-RS antenna port associated with a DL channel (e.g., PDSCH or PDCCH) is based on the activated TCI state. It is noted that the activated TCI state can be a DL TCI state or a joint DL/UL TCI state. Alternatively, if the UE is not provided a TCI state MAC CE activation command, then the UE, in step 1514, assumes that the DM-RS antenna port associated with a DL channel (e.g., PDSCH or PDCCH) is QCLed with the SSB or CSI-RS or SRS the UE used during the most recent random access procedure initiated by Reconfiguration with sync or last transmission.

If a UE is provided a MAC CE TCI state activation command with (i) multiple DL TCI states, (ii) a TCI state configuration with multiple joint DL/UL TCI states, or both, then the UE checks if TCI state(s) has been activated by a DCI (step 1510).

Upon determining that the UE is indicated a TCI state(s) in a DCI, then in step 1512, the UE assumes that the QCL assumption for the DM-RS antenna port associated with a DL channel (e.g., PDSCH or PDCCH) is based on the indicated TCI state(s). It is noted indicated TCI state can be a DL TCI state or a joint DL/UL TCI state. Alternatively, if the UE is not provided a DCI with a TCI state then the UE, in step 1514, assumes that the DM-RS antenna port associated with a DL channel (e.g., PDSCH or PDCCH) is QCLed with the SSB or CSI-RS or SRS the UE used during the most recent random access procedure initiated by Reconfiguration with sync or last transmission.

As shown in FIG. 16, in step 1602, a UE (such as the UE 116) determines if it has been provided with UL TCI state configuration or joint DL/UL TCI state configuration or UL spatial relation.

Upon a determination that the UE is provided with a TCI state configuration with a single TCI state or spatial relation, the UE, in step 1604, assumes that the QCL assumption or spatial relation for the DM-RS antenna port associated with an UL channel (e.g., PUSCH or PUCCH) is based on the configured TCI state. The configured TCI state can be a UL TCI state or a joint DL/UL TCI state or UL spatial relation. Alternatively, if the UE is not provided a TCI state configuration or spatial relation configuration, the UE, in step 1614, assumes that the DM-RS antenna port associated with an UL channel (e.g., PUSCH or PUCCH) is QCLed with or follows a spatial filter associated with the PRACH signal or SRS or SSB or CSI-RS used during the most recent random access procedure initiated by Reconfiguration with sync or last transmission (e.g., last PUSCH transmission triggered by or associated with the random access procedure such as a PUSCH transmission scheduled by the random access response (RAR)).

The UE can also determine that it is provided with a TCI state configuration with multiple UL TCI states, and/or a TCI state configuration with multiple joint DL/UL TCI states and/or multiple UL spatial relations (step 1602). Upon determining that multiple UL and/or joint DL/UL TCI state and/or multiple UL spatial relations, then in step 1606, the UE checks if TCI state(s) and/or UL spatial relations have been activated by a MAC CE.

Upon determining that a single TCI state or UL spatial relation is activated by MAC CE, the UE in step 1608 assumes that the QCL assumption for the DM-RS antenna port associated with an UL channel (e.g., PUSCH or PUCCH) is based on the activated TCI state. The activated TCI state can be a UL TCI state or a joint DL/UL TCI state or UL spatial relation. Alternatively, if the UE is not provided a TCI state or spatial relation MAC CE activation command, the UE in step 1614 assumes that the DM-RS antenna port associated with an UL channel (e.g., PUSCH or PUCCH) is QCLed with or follows a spatial filter associated with the PRACH signal or SRS or SSB or CSI-RS used during the most recent random access procedure initiated by Reconfiguration with sync or last transmission (e.g., last PUSCH transmission triggered by or associated with the random access procedure such as a PUSCH transmission scheduled by the random access response (RAR)).

If the UE is provided with (i) a MAC CE TCI state, (ii) a spatial relation activation command with multiple UL TCI states, (iii) a TCI state configuration with multiple joint DL/UL TCI states, (iv) multiple UL spatial relations, or any combination thereof, then the UE checks if TCI state(s) and/or spatial relation(s) has been activated by a DCI (step 1610).

Upon determining that the UE is indicated a TCI state(s) or spatial relation(s) in a DCI, then in step 1612, the UE assumes that the QCL assumption for the DM-RS antenna port associated with an UL channel (e.g. PUSCH or PUCCH) is based on the indicated TCI state(s) or spatial relation(s). The indicated TCI state can be a UL TCI state or a joint DL/UL TCI state or spatial relation. Alternatively, if the UE is not provided a DCI with a TCI state, the UE assumes that the DM-RS antenna port associated with an UL channel (e.g. PUSCH or PUCCH) is QCLed with or follows a spatial filter associated with the PRACH signal or SRS or SSB or CSI-RS used during the most recent random access procedure initiated by Reconfiguration with sync or last transmission (e.g., last PUSCH transmission triggered by or associated with the random access procedure such as a PUSCH transmission scheduled by the random access response (RAR)) (step 1614).

Although FIGS. 15 and 16 illustrate the flowcharts 1500 and 1600 various changes may be made to FIGS. 15 and 16. For example, while the flowchart 1500 of FIG. 15 and the flowchart 1600 of FIG. 16 are shown as a series of steps, various steps could overlap, occur in parallel, occur in a different order, or occur multiple times. In another example, steps may be omitted or replaced by other steps. For example, steps of the flowchart 1500 can be executed in a different order.

Embodiments of the present disclosure describe a TCI state configuration and signaling for control resource set zero (CORESET 0). The following examples and embodiments, such as those of FIGS. 17 and 18, describe a TCI state configuration and signaling control resource set zero.

Figure 17:
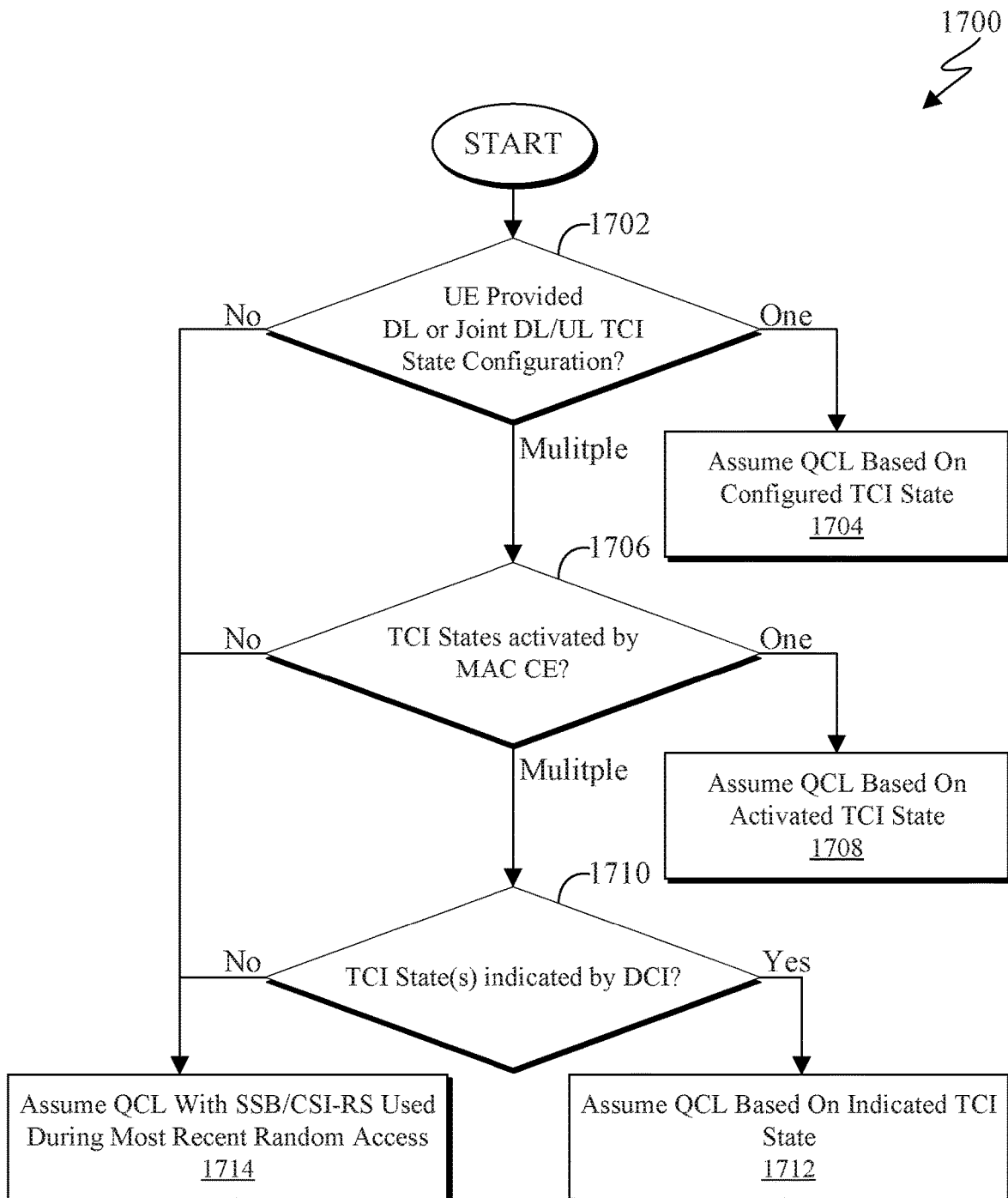
FIG. 17 illustrates a flowchart of a UE determining QCL assumptions for a DM-RS antenna port associated with a physical DL control channel (PDCCH) for control resource set to zero according to embodiments of the present disclosure.
Figure 18:
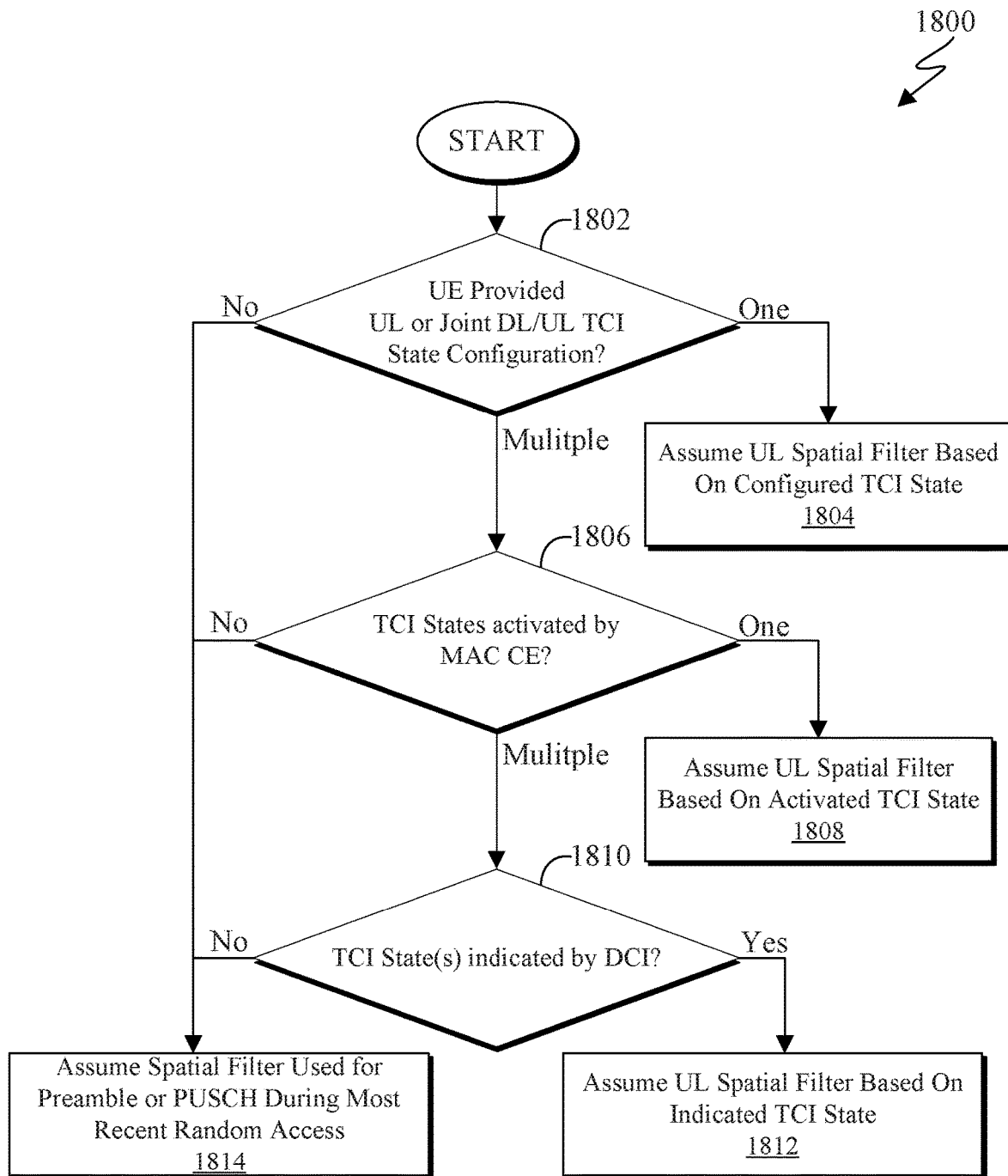
FIG. 18 illustrates a flowchart of a UE determining QCL assumptions for a DM-RS antenna port associated with an UL channel, after a random access procedure not initiated by a PDCCH order that triggers a contention-free access procedure according to embodiments of the present disclosure.

FIG. 17 illustrates a flowchart 1700 describing how a UE determines QCL assumption for a DM-RS antenna port associated with a PDCCH for control resource set zero or a DL transmission in response to a PDCCH in Control Resource set zero according to embodiments of the present disclosure. FIG. 18 illustrates a flowchart 1800 describing how of a UE determines QCL assumptions for a DM-RS antenna port associated with an UL channel, in response to a DL transmission on control resource set zero, after a random access procedure not initiated by a PDCCH order that triggers a contention-free random access procedure according to embodiments of the present disclosure. The steps of the flowchart 1700 and the flowchart 1800 can be performed by any of the UEs 111-116 of FIG. 1, such as the UE 116 of FIG. 3, as well as any of the BSs 101-103 of FIG. 1, such as the BS 102 of FIG. 2. The flowchart 1700 of FIG. 17 and the flowchart 1800 of FIG. 18 are for illustration only and other embodiments can be used without departing from the scope of the present disclosure.

In certain embodiments, during random access procedure a UE finds a beam to communicate on with the base station. The beam can be associated with a SSB or a CSI-RS or an SRS. For Control Resource Set Zero after a random access procedure not initiated by a PDCCH order that triggers a contention-free random access procedure and before a UE has been provided a configuration of DL TCI states or Joint DL/UL TCI states, the UE (such as the UE 116) can assume that the DM-RS antenna port associated with a PDCCH for Control Resource Set Zero or a DL transmission in response to a PDCCH in Control Resource set zero is quasi-co-located (QCLed) with the SSB or CSI-RS or SRS the UE used for the most recent random access procedure not initiated by a PDCCH order that triggers a contention-free random access procedure. Similarly, for UL transmissions in response to a DL transmission on Control Resource Set Zero, after a random access procedure not initiated by a PDCCH order that triggers a contention-free random access procedure and before a UE has been provided a configuration of UL TCI states or joint DL/UL TCI states or UL spatial relations, the UE can assume that the DM-RS antenna port associated with an UL channel (such as PUSCH or PUCCH), in response to a DL transmission on Control Resource Set Zero, is quasi-co-located with or follows a spatial filter associated with the PRACH signal or SRS or SSB or CSI-RS used for the most recent random access procedure not initiated by a PDCCH order that triggers a contention-free random access procedure.

As shown in FIG. 17, in step 1702, a UE (such as the UE 116) checks (determines) if it has been provided with DL TCI state configuration or joint DL/UL TCI state configuration. This determination is performed after configuration after the most recent random access procedure not initiated by a PDCCH order that triggers a contention-free random access procedure.

Upon a determination that the UE is provided with a single TCI state, the UE in step 1704 assumes that the QCL assumption for the DM-RS antenna port associated with a PDCCH for Control Resource Set Zero or a DL transmission in response to a PDCCH in Control Resource set zero is based on the configured TCI state. The configured TCI state can be a DL TCI state or a joint DL/UL TCI state. Alternatively, if the UE determines that it is not provided a TCI state configuration, then the UE in step 1714 assumes that the DM-RS antenna port associated with a PDCCH for Control Resource Set Zero or a DL transmission in response to a PDCCH in Control Resource set zero is QCLed with the SSB or CSI-RS or SRS the UE used for the most recent random access procedure not initiated by a PDCCH order that triggers a contention-free random access procedure or last transmission prior to the UE getting a C-RNTI.

The UE can also determine that it is provided with a TCI state configuration with multiple DL TCI states, and/or a TCI state configuration with multiple joint DL/UL TCI states (step 1702). Upon determining that multiple DL and/or joint DL/UL TCI state configurations, then in step 1706, the UE checks if TCI state(s) have been activated by a MAC CE.

Upon determining that a single TCI state is activated by MAC CE, in step 1708, the UE assumes that the QCL assumption for the DM-RS antenna port associated with a PDCCH for Control Resource Set Zero or a DL transmission in response to a PDCCH in Control Resource set zero is based on the activated TCI state. The activated TCI state can be a DL TCI state or a joint DL/UL TCI state. Alternatively, if the UE is not provided a TCI state MAC CE activation command, then the UE, in step 1714, assumes that the DM-RS antenna port associated with a PDCCH for Control Resource Set Zero or a DL transmission in response to a PDCCH in Control Resource set zero is QCLed with the SSB or CSI-RS or SRS the UE used for the most recent random access procedure not initiated by a PDCCH order that triggers a contention-free random access procedure or last transmission prior to the UE getting a C-RNTI.

If a UE is provided a MAC CE TCI state activation command with (i) multiple DL TCI states, (ii) a TCI state configuration with multiple joint DL/UL TCI states, or both, then the UE checks if TCI state(s) has been activated by a DCI (step 1710).

Upon determining that the UE is indicated a TCI state(s) in a DCI, then in step 1512, the UE assumes that the QCL assumption for the DM-RS antenna port associated with a PDCCH for Control Resource Set Zero or a DL transmission in response to a PDCCH in Control Resource set zero is based on the indicated TCI state(s). The indicated TCI state can be a DL TCI state or a joint DL/UL TCI state. Alternatively, if the UE is not provided a DCI with a TCI state then the UE, in step 1714, assumes that the DM-RS antenna port associated with a DL channel (e.g., PDSCH or PDCCH) is QCLed with the SSB or CSI-RS or SRS the UE used during the most recent random access procedure not initiated by a PDCCH order that triggers a contention-free random access procedure or last transmission prior to the UE getting a C-RNTI.

As shown in FIG. 18, in step 1802, a UE (such as the UE 116) determines if it has been provided with UL TCI state configuration or joint DL/UL TCI state configuration or UL spatial relation. This determination is performed after the most recent random access procedure not initiated by a PDCCH order that triggers a contention-free random access procedure.

Upon a determination that the UE is provided with a TCI state configuration with a single TCI state or spatial relation, the UE, in step 1804, assumes that the QCL assumption or spatial relation for the DM-RS antenna port associated with an UL channel (e.g., PUSCH or PUCCH), in response to a DL transmission on Control Resource Set Zero, is based on the configured TCI state. The configured TCI state can be a UL TCI state or a joint DL/UL TCI state or UL spatial relation. Alternatively, if the UE is not provided a TCI state configuration or spatial relation configuration, the UE, in step 1814, assumes that the DM-RS antenna port associated with an UL channel (e.g., PUSCH or PUCCH), in response to a DL transmission on Control Resource Set Zero, is QCLed with or follows a spatial filter associated with the PRACH signal or SRS or SSB or CSI-RS used for the most recent random access procedure not initiated by a PDCCH order that triggers a contention-free random access procedure or last transmission (e.g., last PUSCH transmission triggered by or associated with the random access procedure such as a PUSCH transmission scheduled by the random access response (RAR)) prior to the UE getting a C-RNTI.

The UE can also determine that it is provided with a TCI state configuration with multiple UL TCI states, and/or a TCI state configuration with multiple joint DL/UL TCI states and/or multiple UL spatial relations (step 1802). Upon determining that multiple UL and/or joint DL/UL TCI state and/or multiple UL spatial relations, then in step 1806, the UE checks if TCI state(s) and/or UL spatial relations have been activated by a MAC CE.

Upon determining that a single TCI state or UL spatial relation is activated by MAC CE, the UE in step 1808 assumes that the QCL assumption for the DM-RS antenna port associated with an UL channel (e.g., PUSCH or PUCCH), in response to a DL transmission on Control Resource Set Zero, is based on the activated TCI state, wherein the activated TCI state can be a UL TCI state or a joint DL/UL TCI state or UL spatial relation. Alternatively, if the UE is not provided a TCI state or spatial relation MAC CE activation command, the UE in step 1814 assumes that the DM-RS antenna port associated with an UL channel (e.g., PUSCH or PUCCH), in response to a DL transmission on Control Resource Set Zero, is QCLed with or follows a spatial filter associated with the PRACH signal or SRS or SSB or CSI-RS used for the most recent random access procedure not initiated by a PDCCH order that triggers a contention-free random access procedure or last transmission (e.g., last PUSCH transmission triggered by or associated with the random access procedure such as a PUSCH transmission scheduled by the random access response (RAR)) prior to the UE getting a C-RNTI.

If the UE is provided with (i) a MAC CE TCI state, (ii) a spatial relation activation command with multiple UL TCI states, (iii) a TCI state configuration with multiple joint DL/UL TCI states, (iv) multiple UL spatial relations, or any combination thereof, then the UE checks if TCI state(s) and/or spatial relation(s) has been activated by a DCI (step 1810).

Upon determining that the UE is indicated a TCI state(s) or spatial relation(s) in a DCI, then in step 1612, the UE assumes that the QCL assumption for the DM-RS antenna port associated with an UL channel (e.g., PUSCH or PUCCH), in response to a DL transmission on Control Resource Set Zero, is based on the indicated TCI state(s) or spatial relation(s), wherein the indicated TCI state can be a UL TCI state or a joint DL/UL TCI state or spatial relation. Alternatively, if the UE is not provided a DCI with a TCI state, the UE assumes that the DM-RS antenna port associated with a UL channel (e.g., PUSCH or PUCCH), in response to a DL transmission on Control Resource Set Zero, is QCLed with or follows a spatial filter associated with the PRACH signal or SRS or SSB or CSI-RS used for the most recent random access procedure not initiated by a PDCCH order that triggers a contention-free random access procedure or last transmission (e.g., last PUSCH transmission triggered by or associated with the random access procedure such as a PUSCH transmission scheduled by the random access response (RAR)) prior to the UE getting a C-RNTI.

Although FIGS. 17 and 18 illustrate the flowcharts 1700 and 1800 various changes may be made to FIGS. 17 and 18. For example, while the flowchart 1700 of FIG. 17 and the flowchart 1800 of FIG. 18 are shown as a series of steps, various steps could overlap, occur in parallel, occur in a different order, or occur multiple times. In another example, steps may be omitted or replaced by other steps. For example, steps of the flowchart 1800 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE), the method comprising:
   receiving, from a base station via a radio resource control (RRC) signaling, information on a first set of joint transmission configuration indication (TCI) states for downlink and uplink;
   when a number of the joint TCI states in the first set is one, transmitting, to the base station, first uplink transmissions using a first spatial filter, wherein the first spatial filter is identified based on the one joint TCI state in the first set; and
   when the number of the joint TCI states in the first set is more than one, transmitting, to the base station, before applying an indicated TCI state from the first set indicated by the base station, the first uplink transmissions using a second spatial filter, wherein the second spatial filter is a same spatial filter for a last uplink transmission during a first random access procedure for initial access,
   wherein the first uplink transmissions include a physical uplink shared channel (PUSCH) transmission and a physical uplink control channel (PUCCH) transmission.

2. The method of claim 1, further comprising:
   receiving, from the base station via the RRC signaling, information on a second set of uplink TCI states for uplink, wherein a number of the uplink TCI states in the second set is more than one; and
   wherein transmitting the first uplink transmissions further comprises transmitting, to the base station, before applying an indicated TCI state in the second set of TCI states, the first uplink transmissions.

3. The method of claim 1, further comprising:
   transmitting, to the base station, before applying the indicated TCI state in the first set, second uplink transmissions using a third spatial filter,
   wherein the third spatial filter is a same spatial filter for a last uplink transmission during a second random access procedure,
   wherein the second random access procedure is initiated by a reconfiguration with sync procedure with the base station, and
   wherein the second uplink transmissions include a PUSCH transmission and a PUCCH transmission.

4. The method of claim 2, further comprising:
   transmitting, to the base station, before applying the indicated TCI state in the second set, second uplink transmissions using a third spatial filter,
   wherein the third spatial filter is a same spatial filter for a last uplink transmission during a second random access procedure,
   wherein the second random access procedure is initiated by a reconfiguration with sync procedure with the base station, and
   wherein the second uplink transmissions include a PUSCH transmission and a PUCCH transmission.

5. The method of claim 1, further comprising:
   receiving, from the base station, a medium access control control element (MAC CE),
   wherein, when one TCI state in the first set is activated by the MAC CE, the indicated TCI state is the one TCI state activated by the MAC CE, and
   wherein, when more than one TCI state in the first set is activated by the MAC CE, the indicated TCI state is one TCI state indicated by downlink control information (DCI) among the more than one TCI state activated by the MAC CE.

6. The method of claim 1, further comprising:
receiving, from the base station, first downlink receptions based on assuming that first demodulation reference signals (DM-RSs) of the first downlink receptions are respectively quasi-co-located with a synchronization signal block (SSB) identified for the initial access, before applying the indicated TCI state in the first set,
wherein the first downlink receptions include a physical downlink shared channel (PDSCH) reception and a physical downlink control channel (PDCCH) reception, and
wherein the first DM-RSs include a DM-RS of the PDSCH reception and a DM-RS of the PDCCH reception.

7. The method of claim 1, wherein the last uplink transmission is a PUSCH transmission scheduled by a random access response (RAR) during the first random access procedure.

8. A user equipment (UE) comprising:
a processor; and
a transceiver operably coupled to the processor, the transceiver configured to:
receive, from a base station via a radio resource control (RRC) signaling, information on a first set of joint transmission configuration indication (TCI) states for downlink and uplink;
when a number of the joint TCI states in the first set is one, transmit, to the base station, first uplink transmissions using a first spatial filter, wherein the first spatial filter is identified based on the one joint TCI state in the first set; and
when the number of the joint TCI states in the first set is more than one, transmit, to the base station, before applying an indicated TCI state from the first set indicated by the base station, the first uplink transmissions using a second spatial filter, wherein the second spatial filter is a same spatial filter for a last uplink transmission during a first random access procedure for initial access,
wherein the first uplink transmissions include a physical uplink shared channel (PUSCH) transmission and a physical uplink control channel (PUCCH) transmission.

9. The UE of claim 8, wherein the transceiver is further configured to:
receive, from the base station via the RRC signaling, information on a second set of uplink TCI states for uplink, wherein a number of the uplink TCI states in the second set is more than one; and
transmit, to the base station, before applying an indicated TCI state in the second set of TCI states, the first uplink transmissions.

10. The UE of claim 8, wherein;
the transceiver is further configured to transmit, to the base station, before applying the indicated TCI state in the first set, second uplink transmissions using a third spatial filter,
wherein the third spatial filter is a same spatial filter for a last uplink transmission during a second random access procedure,
wherein the second random access procedure is initiated by a reconfiguration with sync procedure with the base station, and
wherein the second uplink transmissions include a PUSCH transmission and a PUCCH transmission.

11. The UE of claim 9, wherein;
the transceiver is further configured to transmit, to the base station, before applying the indicated TCI state in the second set, second uplink transmissions using a third spatial filter,
wherein the third spatial filter is a same spatial filter for a last uplink transmission during a second random access procedure,
wherein the second random access procedure is initiated by a reconfiguration with sync procedure with the base station, and
wherein the second uplink transmissions include a PUSCH transmission and a PUCCH transmission.

12. The UE of claim 8, wherein:
the transceiver is further configured to receive, from the base station, a medium access control control element (MAC CE),
wherein, when one TCI state in the first set is activated by the MAC CE, the indicated TCI state is the one TCI state activated by the MAC CE, and
wherein, when more than one TCI state in the first set is activated by the MAC CE, the indicated TCI state is one TCI state indicated by downlink control information (DCI) among the more than one TCI state activated by the MAC CE.

13. The UE of claim 8, wherein:
the transceiver is further configured to receive, from the base station, first downlink receptions based on assuming that first demodulation reference signals (DM-RSs) of the first downlink receptions are respectively quasi-co-located with a synchronization signal block (SSB) identified for the initial access, before applying the indicated TCI state in the first set,
the first downlink receptions include a physical downlink shared channel (PDSCH) reception and a physical downlink control channel (PDCCH) reception, and
the first DM-RSs include a DM-RS of the PDSCH reception and a DM-RS of the PDCCH reception.

14. The UE of claim 8, wherein the last uplink transmission is a PUSCH transmission scheduled by a random access response (RAR) during the first random access procedure.

15. A base station comprising:
a processor; and
a transceiver operably coupled to the processor, the transceiver configured to:
transmit, to a UE via a radio resource control (RRC) signaling, information on a first set of joint transmission configuration indication (TCI) states for downlink and uplink;
when a number of the joint TCI states in the first set is one, receive, from the UE, first uplink receptions corresponding to a first spatial filter, wherein the first spatial filter is identified based on the one joint TCI state in the first set,
when the number of the joint TCI states in the first set is more than one, receive, from the UE, before indicating a TCI state from the first set to the UE, the first uplink receptions corresponding to a second spatial filter, wherein the second spatial filter is a same spatial filter for a last uplink reception during a first random access procedure for initial access; and
wherein the first uplink receptions include a physical uplink shared channel (PUSCH) reception and a physical uplink control channel (PUCCH) reception.

16. The base station of claim 15, wherein the transceiver is further configured to:
- transmit, to the UE via the RRC signaling, information on a second set of uplink TCI states for uplink, wherein a number of the uplink TCI states in the second set is more than one; and
- receive, from the UE, before applying an indicated TCI state in the second set of TCI states, the first uplink receptions.

17. The base station of claim 15, wherein:
- the transceiver is further configured to receive, from the UE, before applying the indicated TCI state in the first set, second uplink receptions corresponding to a third spatial filter,
- wherein the third spatial filter is a same spatial filter for a last uplink reception during a second random access procedure,
- wherein the second random access procedure is initiated by a reconfiguration with sync procedure with the base station, and
- wherein the second uplink receptions include a PUSCH reception and a PUCCH reception.

18. The base station of claim 16, wherein;
- the transceiver is further configured to receive, from the UE, before applying the indicated TCI state in the second set, second uplink receptions corresponding to a third spatial filter,
- wherein the third spatial filter is a same spatial filter for a last uplink reception during a second random access procedure,
- wherein the second random access procedure is initiated by a reconfiguration with sync procedure with the base station, and
- wherein the second uplink receptions include a PUSCH reception and a PUCCH reception.

19. The base station of claim 15, wherein:
- the transceiver is further configured to receive, from the base station, a medium access control control element (MAC CE),
- wherein, when one TCI state in the first set is activated by the MAC CE, the indicated TCI state is the one TCI state activated by the MAC CE, and
- wherein, when more than one TCI state in the first set is activated by the MAC CE, the indicated TCI state is one TCI state indicated by downlink control information (DCI) among the more than one TCI state activated by the MAC CE.

20. The base station of claim 15, wherein:
- the transceiver is further configured to transmit, to the UE, first downlink transmissions based on assuming that first demodulation reference signals (DM-RSs) of the first downlink transmissions are respectively quasi-co-located with a synchronization signal block (SSB) identified for the initial access, before applying the indicated TCI state in the first set,
- the first downlink transmissions include a physical downlink shared channel (PDSCH) transmission and a physical downlink control channel (PDCCH) transmission, and
- the first DM-RSs include a DM-RS of the PDSCH transmission and a DM-RS of the PDCCH transmission, and
- the last uplink reception is a PUSCH transmission scheduled by a random access response (RAR) during the initial-first random access procedure.

* * * * *